(12) United States Patent
Nassar

(10) Patent No.: US 8,930,897 B2
(45) Date of Patent: Jan. 6, 2015

(54) DATA INTEGRATION TOOL

(71) Applicant: Palantir Technologies, Inc., Palo Alto, CA (US)

(72) Inventor: Anthony Albert Nassar, Reston, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 14/044,800

(22) Filed: Oct. 2, 2013

(65) Prior Publication Data

US 2014/0282409 A1   Sep. 18, 2014

Related U.S. Application Data

(60) Provisional application No. 61/801,222, filed on Mar. 15, 2013.

(51) Int. Cl.
*G06F 9/44* (2006.01)
*G06F 11/36* (2006.01)

(52) U.S. Cl.
CPC .................. *G06F 11/362* (2013.01)
USPC ............ 717/115; 717/107; 717/124; 717/126

(58) Field of Classification Search
CPC ... G06F 8/34; G06F 9/44589; G06F 9/45512; G06F 11/3688
See application file for complete search history.

(56) References Cited

U.S. PATENT DOCUMENTS

| | | |
|---|---|---|
| 4,899,161 A | 2/1990 | Morin et al. |
| 4,958,305 A | 9/1990 | Piazza |
| 5,412,769 A | 5/1995 | Maruoka et al. |
| 5,414,838 A | 5/1995 | Kolton et al. |
| 5,444,819 A | 8/1995 | Negishi |
| 5,454,104 A | 9/1995 | Steidlmayer et al. |
| 5,542,089 A | 7/1996 | Lindsay et al. |
| 5,555,503 A | 9/1996 | Kyrtsos et al. |

(Continued)

FOREIGN PATENT DOCUMENTS

| | | |
|---|---|---|
| EP | 1109116 A1 | 6/2001 |
| EP | 1146649 A1 | 10/2001 |

(Continued)

OTHER PUBLICATIONS

Morrison et al., Converting users to testers: an alternative approach to load test script creation, parameterization and data corellation, Dec. 2009, 9 pages.*

(Continued)

*Primary Examiner* — Thuy Dao
(74) *Attorney, Agent, or Firm* — Finnegan, Henderson, Farabow, Garrett & Dunner, LLP

(57) ABSTRACT

Computer-implemented systems and methods are disclosed for providing proactive validations of transformation scripts. In one implementation, a method is provided that includes associating, with at least one processor, the transformation script with ontology parameters. The method also includes initiating a debugging operation of the transformation script having at least one condition and importing, from a data source, at least one data item for transformation. The method further includes determining, as part of the debugging operation, whether the at least one condition that uses the at least one data item is valid based on the ontology parameters and notifying a user, on a display device, of a result associated with the determination.

18 Claims, 12 Drawing Sheets

(56) References Cited

U.S. PATENT DOCUMENTS

| | | | |
|---|---|---|---|
| 5,568,390 | A | 10/1996 | Hirota et al. |
| 5,613,105 | A | 3/1997 | Xbikowski et al. |
| 5,724,575 | A | 3/1998 | Hoover et al. |
| 5,754,182 | A | 5/1998 | Kobayashi |
| 5,781,195 | A | 7/1998 | Marvin |
| 5,781,704 | A | 7/1998 | Rossmo |
| 5,826,021 | A | 10/1998 | Mastors et al. |
| 5,832,218 | A | 11/1998 | Gibbs et al. |
| 5,872,973 | A | 2/1999 | Mitchell et al. |
| 5,878,434 | A | 3/1999 | Draper et al. |
| 5,897,636 | A | 4/1999 | Kaeser |
| 5,902,349 | A | 5/1999 | Endo et al. |
| 5,966,706 | A | 10/1999 | Biliris et al. |
| 6,006,242 | A | 12/1999 | Poole et al. |
| 6,012,042 | A | 1/2000 | Black et al. |
| 6,057,757 | A | 5/2000 | Arrowsmith et al. |
| 6,072,942 | A | 6/2000 | Stockwell et al. |
| 6,073,129 | A | 6/2000 | Levine et al. |
| 6,104,401 | A | 8/2000 | Parsons |
| 6,134,582 | A | 10/2000 | Kennedy |
| 6,157,747 | A | 12/2000 | Szeliski et al. |
| 6,161,098 | A | 12/2000 | Wallman |
| 6,189,005 | B1 | 2/2001 | Chakrabarti et al. |
| 6,216,140 | B1 | 4/2001 | Kramer |
| 6,219,053 | B1 | 4/2001 | Tachibana et al. |
| 6,232,971 | B1 | 5/2001 | Haynes |
| 6,236,994 | B1 | 5/2001 | Swartz et al. |
| 6,243,717 | B1 | 6/2001 | Gordon et al. |
| 6,279,018 | B1 | 8/2001 | Kudrolli et al. |
| 6,289,334 | B1 | 9/2001 | Reiner et al. |
| 6,289,338 | B1 | 9/2001 | Stoffel et al. |
| 6,304,873 | B1 | 10/2001 | Klein et al. |
| 6,311,181 | B1 | 10/2001 | Lee et al. |
| 6,313,833 | B1 | 11/2001 | Knight |
| 6,341,310 | B1 | 1/2002 | Leshem et al. |
| 6,369,835 | B1 | 4/2002 | Lin |
| 6,389,289 | B1 | 5/2002 | Voce et al. |
| 6,414,683 | B1 | 7/2002 | Gueziec |
| 6,418,438 | B1 | 7/2002 | Campbell |
| 6,463,404 | B1 | 10/2002 | Appleby |
| 6,483,509 | B1 | 11/2002 | Rabenhorst |
| 6,496,774 | B1 | 12/2002 | Davies |
| 6,496,817 | B1 | 12/2002 | Whang et al. |
| 6,513,019 | B2 | 1/2003 | Lewis |
| 6,519,627 | B1 | 2/2003 | Dan et al. |
| 6,523,019 | B1 | 2/2003 | Borthwick |
| 6,523,172 | B1 | 2/2003 | Martinez-Guerra et al. |
| 6,529,900 | B1 | 3/2003 | Patterson et al. |
| 6,539,538 | B1 * | 3/2003 | Brewster et al. ............... 717/115 |
| 6,549,944 | B1 | 4/2003 | Weinberg et al. |
| 6,574,635 | B2 | 6/2003 | Stauber et al. |
| 6,608,559 | B1 | 8/2003 | Lemelson et al. |
| 6,640,231 | B1 | 10/2003 | Andersen et al. |
| 6,662,103 | B1 | 12/2003 | Skolnick et al. |
| 6,662,202 | B1 | 12/2003 | Krusche et al. |
| 6,714,936 | B1 | 3/2004 | Nevin, III |
| 6,745,382 | B1 | 6/2004 | Zothner |
| 6,748,481 | B1 | 6/2004 | Parry et al. |
| 6,757,445 | B1 | 6/2004 | Knopp |
| 6,801,201 | B2 | 10/2004 | Escher |
| 6,839,745 | B1 | 1/2005 | Dingari et al. |
| 6,876,981 | B1 | 4/2005 | Berckmans |
| 6,877,137 | B1 | 4/2005 | Rivette et al. |
| 6,907,426 | B2 | 6/2005 | Hellerstein et al. |
| 6,920,453 | B2 | 7/2005 | Mannila et al. |
| 6,978,419 | B1 | 12/2005 | Kantrowitz |
| 7,027,974 | B1 | 4/2006 | Busch et al. |
| 7,043,449 | B1 | 5/2006 | Li et al. |
| 7,058,648 | B1 | 6/2006 | Lightfoot et al. |
| 7,089,541 | B2 | 8/2006 | Ungar |
| 7,111,231 | B1 | 9/2006 | Huck et al. |
| 7,133,409 | B1 | 11/2006 | Willardson |
| 7,139,800 | B2 | 11/2006 | Bellotti et al. |
| 7,171,427 | B2 | 1/2007 | Witkowski et al. |
| 7,181,423 | B2 | 2/2007 | Blanchard et al. |
| 7,185,065 | B1 | 2/2007 | Holtzman et al. |
| 7,216,299 | B2 | 5/2007 | Knight |
| 7,237,192 | B1 | 6/2007 | Stephenson et al. |
| 7,240,330 | B2 | 7/2007 | Fairweather |
| 7,246,090 | B1 | 7/2007 | Thomas |
| 7,278,105 | B1 | 10/2007 | Kitts |
| 7,373,669 | B2 | 5/2008 | Eisen |
| 7,375,732 | B2 | 5/2008 | Arcas |
| 7,379,903 | B2 | 5/2008 | Caballero et al. |
| 7,383,053 | B2 | 6/2008 | Kent et al. |
| 7,401,038 | B2 | 7/2008 | Masuda |
| 7,403,921 | B2 | 7/2008 | Tanpoco et al. |
| 7,403,922 | B1 | 7/2008 | Lewis et al. |
| 7,403,942 | B1 | 7/2008 | Bayliss |
| 7,426,654 | B2 | 9/2008 | Adams et al. |
| 7,437,664 | B2 | 10/2008 | Borson |
| 7,454,466 | B2 | 11/2008 | Bellotti et al. |
| 7,457,706 | B2 | 11/2008 | Melero et al. |
| 7,461,158 | B2 | 12/2008 | Rider et al. |
| 7,467,375 | B2 | 12/2008 | Tondreau et al. |
| 7,469,238 | B2 | 12/2008 | Satchwell |
| 7,519,470 | B2 | 4/2009 | Brasche et al. |
| 7,519,589 | B2 | 4/2009 | Charnock et al. |
| 7,525,422 | B2 | 4/2009 | Bishop et al. |
| 7,529,195 | B2 | 5/2009 | Gorman |
| 7,533,069 | B2 | 5/2009 | Fairweather |
| 7,539,666 | B2 | 5/2009 | Ashworth et al. |
| 7,542,934 | B2 | 6/2009 | Markel |
| 7,558,677 | B2 | 7/2009 | Jones |
| 7,590,582 | B2 | 9/2009 | Dunne |
| 7,603,229 | B2 | 10/2009 | Goldberg et al. |
| 7,617,232 | B2 | 11/2009 | Gabbert et al. |
| 7,620,582 | B2 | 11/2009 | Masuda |
| 7,627,812 | B2 | 12/2009 | Chamberlain et al. |
| 7,634,717 | B2 | 12/2009 | Chamberlain et al. |
| 7,652,622 | B2 | 1/2010 | Hansen et al. |
| 7,663,621 | B1 | 2/2010 | Allen et al. |
| 7,685,042 | B1 | 3/2010 | Monroe et al. |
| 7,685,083 | B2 | 3/2010 | Fairweather |
| 7,703,021 | B1 | 4/2010 | Flam |
| 7,716,077 | B1 | 5/2010 | Mikurak |
| 7,716,227 | B1 | 5/2010 | Hao et al. |
| 7,739,246 | B2 | 6/2010 | Mooney et al. |
| 7,757,220 | B2 | 7/2010 | Griffith et al. |
| 7,770,100 | B2 | 8/2010 | Chamberlain et al. |
| 7,783,658 | B1 | 8/2010 | Bayliss |
| 7,783,679 | B2 | 8/2010 | Bley |
| 7,791,616 | B2 | 9/2010 | Ioup et al. |
| 7,814,102 | B2 | 10/2010 | Miller |
| 7,818,658 | B2 | 10/2010 | Chen |
| 7,835,966 | B2 | 11/2010 | Satchwell |
| 7,848,995 | B2 | 12/2010 | Dalal |
| 7,853,573 | B2 | 12/2010 | Warner et al. |
| 7,872,647 | B2 | 1/2011 | Mayer et al. |
| 7,877,421 | B2 | 1/2011 | Berger et al. |
| 7,908,521 | B2 | 3/2011 | Sridharan et al. |
| 7,912,842 | B1 | 3/2011 | Bayliss |
| 7,945,852 | B1 | 5/2011 | Pilskalns |
| 7,962,495 | B2 | 6/2011 | Jain et al. |
| 7,962,848 | B2 | 6/2011 | Bertram |
| 8,001,465 | B2 | 8/2011 | Kudrolli et al. |
| 8,001,482 | B2 | 8/2011 | Bhattiprolu et al. |
| 8,015,487 | B2 | 9/2011 | Roy et al. |
| 8,036,971 | B2 | 10/2011 | Aymeloglu et al. |
| 8,041,714 | B2 | 10/2011 | Aymeloglu et al. |
| 8,046,283 | B2 | 10/2011 | Burns |
| 8,046,362 | B2 | 10/2011 | Bayliss |
| 8,065,080 | B2 | 11/2011 | Koch |
| 8,073,857 | B2 | 12/2011 | Sreekanth |
| 8,085,268 | B2 | 12/2011 | Carrino et al. |
| 8,103,962 | B2 | 1/2012 | Embley et al. |
| 8,108,138 | B2 | 1/2012 | Bruce et al. |
| 8,117,022 | B2 | 2/2012 | Linker |
| 8,126,848 | B2 | 2/2012 | Wagner |
| 8,132,149 | B2 * | 3/2012 | Shenfield et al. ............... 717/107 |
| 8,135,679 | B2 | 3/2012 | Bayliss |
| 8,135,719 | B2 | 3/2012 | Bayliss |
| 8,225,201 | B2 | 7/2012 | Michael |
| 8,230,333 | B2 | 7/2012 | Decherd et al. |

(56) References Cited

U.S. PATENT DOCUMENTS

| | | |
|---|---|---|
| 8,266,168 B2 | 9/2012 | Bayliss |
| 8,271,948 B2 * | 9/2012 | Talozi et al. ............ 717/124 |
| 8,280,880 B1 | 10/2012 | Aymeloglu et al. |
| 8,321,943 B1 | 11/2012 | Walters et al. |
| 8,325,178 B1 | 12/2012 | Doyle, Jr. |
| 8,326,727 B2 | 12/2012 | Aymeloglu et al. |
| 8,347,398 B1 | 1/2013 | Weber |
| 8,352,174 B2 | 1/2013 | Milstein et al. |
| 8,364,642 B1 | 1/2013 | Garrod |
| 8,400,448 B1 | 3/2013 | Doyle, Jr. |
| 8,417,409 B2 | 4/2013 | Bast et al. |
| 8,422,825 B1 | 4/2013 | Neophytou et al. |
| 8,429,194 B2 | 4/2013 | Aymeloglu et al. |
| 8,429,527 B1 | 4/2013 | Arbogast |
| 8,433,703 B1 | 4/2013 | Schneider et al. |
| 8,447,674 B2 | 5/2013 | Choudhuri et al. |
| 8,447,722 B1 | 5/2013 | Ahuja et al. |
| 8,484,115 B2 | 7/2013 | Aymeloglu et al. |
| 8,484,168 B2 | 7/2013 | Bayliss |
| 8,489,623 B2 | 7/2013 | Jain et al. |
| 8,489,641 B1 | 7/2013 | Seefeld et al. |
| 8,494,941 B2 | 7/2013 | Aymeloglu et al. |
| 8,495,077 B2 | 7/2013 | Bayliss |
| 8,498,969 B2 | 7/2013 | Bayliss |
| 8,499,287 B2 | 7/2013 | Shafi et al. |
| 8,514,082 B2 | 8/2013 | Cova et al. |
| 8,515,912 B2 | 8/2013 | Garrod et al. |
| 8,527,461 B2 | 9/2013 | Ducott et al. |
| 8,554,579 B2 | 10/2013 | Tribble et al. |
| 8,560,494 B1 | 10/2013 | Downing |
| 8,577,911 B1 | 11/2013 | Stepinski et al. |
| 8,600,872 B1 | 12/2013 | Yan |
| 8,601,326 B1 | 12/2013 | Kirn |
| 8,620,641 B2 | 12/2013 | Farnsworth et al. |
| 8,689,108 B1 | 4/2014 | Duffield et al. |
| 8,689,182 B2 * | 4/2014 | Leithead et al. ............ 717/115 |
| 2001/0011243 A1 | 8/2001 | Dembo et al. |
| 2001/0021936 A1 | 9/2001 | Bertram |
| 2001/0051949 A1 | 12/2001 | Carey et al. |
| 2001/0056522 A1 | 12/2001 | Satyanarayana |
| 2002/0003539 A1 | 1/2002 | Abe |
| 2002/0007331 A1 | 1/2002 | Lo et al. |
| 2002/0026404 A1 | 2/2002 | Thompson |
| 2002/0030701 A1 | 3/2002 | Knight |
| 2002/0035590 A1 | 3/2002 | Eibach et al. |
| 2002/0059126 A1 | 5/2002 | Ricciardi |
| 2002/0087570 A1 | 7/2002 | Jacquez et al. |
| 2002/0091694 A1 | 7/2002 | Hrle et al. |
| 2002/0099870 A1 | 7/2002 | Miller et al. |
| 2002/0130867 A1 | 9/2002 | Yang et al. |
| 2002/0130907 A1 | 9/2002 | Chi et al. |
| 2002/0147671 A1 | 10/2002 | Sloan et al. |
| 2002/0147805 A1 | 10/2002 | Leshem et al. |
| 2002/0156812 A1 | 10/2002 | Krasnoiarov et al. |
| 2002/0174201 A1 | 11/2002 | Ramer et al. |
| 2002/0184111 A1 | 12/2002 | Swanson |
| 2003/0004770 A1 | 1/2003 | Miller et al. |
| 2003/0009392 A1 | 1/2003 | Perkowski |
| 2003/0009399 A1 | 1/2003 | Boerner |
| 2003/0023620 A1 | 1/2003 | Trotta |
| 2003/0028560 A1 | 2/2003 | Kudrolli et al. |
| 2003/0052896 A1 | 3/2003 | Higgins et al. |
| 2003/0065606 A1 | 4/2003 | Satchwell |
| 2003/0065607 A1 | 4/2003 | Satchwell |
| 2003/0078827 A1 | 4/2003 | Hoffman |
| 2003/0093401 A1 | 5/2003 | Czahkowski et al. |
| 2003/0097330 A1 | 5/2003 | Hillmer et al. |
| 2003/0103049 A1 | 6/2003 | Kindratenko et al. |
| 2003/0105759 A1 | 6/2003 | Bess et al. |
| 2003/0115481 A1 | 6/2003 | Baird et al. |
| 2003/0120675 A1 | 6/2003 | Stauber et al. |
| 2003/0130996 A1 | 7/2003 | Bayerl et al. |
| 2003/0139957 A1 | 7/2003 | Satchwell |
| 2003/0172053 A1 | 9/2003 | Fairweather |
| 2003/0177112 A1 | 9/2003 | Gardner |
| 2003/0182313 A1 | 9/2003 | Federwisch et al. |
| 2003/0184588 A1 | 10/2003 | Lee |
| 2003/0187761 A1 | 10/2003 | Olsen et al. |
| 2003/0200217 A1 | 10/2003 | Ackerman |
| 2003/0212718 A1 | 11/2003 | Tester |
| 2004/0003009 A1 | 1/2004 | Wilmot |
| 2004/0006523 A1 | 1/2004 | Coker |
| 2004/0030492 A1 | 2/2004 | Fox et al. |
| 2004/0039498 A1 | 2/2004 | Ollis et al. |
| 2004/0044992 A1 * | 3/2004 | Muller et al. ............ 717/124 |
| 2004/0083466 A1 | 4/2004 | Dapp et al. |
| 2004/0098236 A1 | 5/2004 | Mayer et al. |
| 2004/0098731 A1 | 5/2004 | Demsey et al. |
| 2004/0111390 A1 | 6/2004 | Saito et al. |
| 2004/0117345 A1 | 6/2004 | Bamford et al. |
| 2004/0117387 A1 | 6/2004 | Civetta et al. |
| 2004/0133500 A1 | 7/2004 | Thompson et al. |
| 2004/0153451 A1 | 8/2004 | Phillips et al. |
| 2004/0181554 A1 | 9/2004 | Heckerman et al. |
| 2004/0193599 A1 | 9/2004 | Liu et al. |
| 2004/0203380 A1 | 10/2004 | Hamdi et al. |
| 2004/0210763 A1 | 10/2004 | Jonas |
| 2004/0250124 A1 | 12/2004 | Chesla et al. |
| 2005/0021397 A1 | 1/2005 | Cui et al. |
| 2005/0028094 A1 | 2/2005 | Allyn |
| 2005/0031197 A1 | 2/2005 | Knopp |
| 2005/0034062 A1 | 2/2005 | Bufkin et al. |
| 2005/0060712 A1 | 3/2005 | Miller et al. |
| 2005/0060713 A1 | 3/2005 | Miller et al. |
| 2005/0075962 A1 | 4/2005 | Dunne |
| 2005/0075966 A1 | 4/2005 | Duka |
| 2005/0090911 A1 | 4/2005 | Ingargiola et al. |
| 2005/0091420 A1 * | 4/2005 | Snover et al. ............ 710/1 |
| 2005/0097441 A1 | 5/2005 | Herbach et al. |
| 2005/0108001 A1 | 5/2005 | Aarskog |
| 2005/0108231 A1 | 5/2005 | Findleton et al. |
| 2005/0114763 A1 | 5/2005 | Nonomura et al. |
| 2005/0125715 A1 | 6/2005 | Franco et al. |
| 2005/0171881 A1 | 8/2005 | Ghassemieh et al. |
| 2005/0180330 A1 | 8/2005 | Shapiro |
| 2005/0182502 A1 | 8/2005 | Iyengar |
| 2005/0182709 A1 | 8/2005 | Belcsak et al. |
| 2005/0182793 A1 | 8/2005 | Keenan et al. |
| 2005/0183005 A1 | 8/2005 | Denoue et al. |
| 2005/0223044 A1 | 10/2005 | Ashworth et al. |
| 2005/0226473 A1 | 10/2005 | Ramesh |
| 2005/0256703 A1 | 11/2005 | Markel |
| 2005/0262004 A1 | 11/2005 | Sakata et al. |
| 2005/0262057 A1 | 11/2005 | Lesh et al. |
| 2005/0262493 A1 | 11/2005 | Schmidt et al. |
| 2005/0262512 A1 | 11/2005 | Schmidt et al. |
| 2005/0262556 A1 | 11/2005 | Waisman et al. |
| 2005/0289524 A1 | 12/2005 | McGinnes |
| 2006/0010130 A1 | 1/2006 | Leff et al. |
| 2006/0020398 A1 | 1/2006 | Vernon et al. |
| 2006/0026170 A1 | 2/2006 | Kreitler et al. |
| 2006/0045470 A1 | 3/2006 | Poslinski et al. |
| 2006/0059072 A1 | 3/2006 | Boglaev |
| 2006/0064181 A1 | 3/2006 | Kato |
| 2006/0074866 A1 | 4/2006 | Chamberlain et al. |
| 2006/0080316 A1 | 4/2006 | Gilmore et al. |
| 2006/0080616 A1 | 4/2006 | Vogel et al. |
| 2006/0080619 A1 | 4/2006 | Carlson et al. |
| 2006/0116943 A1 | 6/2006 | Willain |
| 2006/0116991 A1 | 6/2006 | Calderwood |
| 2006/0129746 A1 | 6/2006 | Porter |
| 2006/0146050 A1 | 7/2006 | Yamauchi |
| 2006/0161558 A1 | 7/2006 | Tamma et al. |
| 2006/0190497 A1 | 8/2006 | Inturi et al. |
| 2006/0206235 A1 | 9/2006 | Shakes et al. |
| 2006/0209085 A1 | 9/2006 | Wong et al. |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0224356 A1 | 10/2006 | Castelli et al. |
| 2006/0235786 A1 | 10/2006 | DiSalvo |
| 2006/0241856 A1 | 10/2006 | Cobleigh et al. |
| 2006/0251307 A1 | 11/2006 | Florin et al. |
| 2006/0253502 A1 | 11/2006 | Raman et al. |

(56) References Cited

U.S. PATENT DOCUMENTS

| | | |
|---|---|---|
| 2006/0265311 A1 | 11/2006 | Dean et al. |
| 2006/0265397 A1 | 11/2006 | Bryan et al. |
| 2006/0288046 A1 | 12/2006 | Gupta et al. |
| 2007/0011150 A1 | 1/2007 | Frank |
| 2007/0011304 A1 | 1/2007 | Error |
| 2007/0024620 A1 | 2/2007 | Muller-Fischer et al. |
| 2007/0050429 A1 | 3/2007 | Goldring et al. |
| 2007/0055598 A1 | 3/2007 | Arnott et al. |
| 2007/0055599 A1 | 3/2007 | Arnott |
| 2007/0061487 A1 | 3/2007 | Moore et al. |
| 2007/0067233 A1 | 3/2007 | Dalal |
| 2007/0067285 A1 | 3/2007 | Blume |
| 2007/0074169 A1* | 3/2007 | Chess et al. .................. 717/126 |
| 2007/0078872 A1 | 4/2007 | Cohen |
| 2007/0091868 A1 | 4/2007 | Hollman et al. |
| 2007/0094248 A1 | 4/2007 | McVeigh et al. |
| 2007/0112714 A1 | 5/2007 | Fairweather |
| 2007/0113164 A1 | 5/2007 | Hansen et al. |
| 2007/0118527 A1 | 5/2007 | Winje et al. |
| 2007/0136115 A1 | 6/2007 | Doganaksoy et al. |
| 2007/0143253 A1 | 6/2007 | Kostamaa et al. |
| 2007/0168269 A1 | 7/2007 | Chuo |
| 2007/0168336 A1 | 7/2007 | Ransil et al. |
| 2007/0174760 A1 | 7/2007 | Chamberlain et al. |
| 2007/0188516 A1 | 8/2007 | Loup et al. |
| 2007/0219882 A1 | 9/2007 | May |
| 2007/0226617 A1 | 9/2007 | Traub et al. |
| 2007/0233756 A1 | 10/2007 | D'Souza et al. |
| 2007/0258642 A1 | 11/2007 | Thota |
| 2007/0266336 A1 | 11/2007 | Nojima et al. |
| 2007/0271317 A1 | 11/2007 | Carmel |
| 2007/0282951 A1 | 12/2007 | Selimis et al. |
| 2007/0299697 A1 | 12/2007 | Friedlander et al. |
| 2008/0005063 A1 | 1/2008 | Seeds et al. |
| 2008/0010605 A1 | 1/2008 | Frank |
| 2008/0015920 A1 | 1/2008 | Fawls et al. |
| 2008/0015970 A1 | 1/2008 | Brookfield et al. |
| 2008/0040250 A1 | 2/2008 | Salter |
| 2008/0040684 A1 | 2/2008 | Crump |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0085278 A1 | 4/2008 | Durrant et al. |
| 2008/0098085 A1 | 4/2008 | Krane et al. |
| 2008/0104019 A1 | 5/2008 | Nath |
| 2008/0140387 A1 | 6/2008 | Linker |
| 2008/0163073 A1 | 7/2008 | Becker et al. |
| 2008/0183639 A1 | 7/2008 | DiSalvo |
| 2008/0192053 A1 | 8/2008 | Howell et al. |
| 2008/0195672 A1 | 8/2008 | Hamel et al. |
| 2008/0201339 A1 | 8/2008 | McGrew |
| 2008/0208820 A1 | 8/2008 | Usey et al. |
| 2008/0215546 A1 | 9/2008 | Baum et al. |
| 2008/0223834 A1 | 9/2008 | Griffiths et al. |
| 2008/0228467 A1 | 9/2008 | Womack et al. |
| 2008/0243711 A1 | 10/2008 | Aymeloglu et al. |
| 2008/0243951 A1 | 10/2008 | Webman et al. |
| 2008/0249957 A1 | 10/2008 | Masuyama et al. |
| 2008/0263468 A1 | 10/2008 | Cappione et al. |
| 2008/0270468 A1 | 10/2008 | Mao |
| 2008/0276167 A1 | 11/2008 | Michael |
| 2008/0281580 A1 | 11/2008 | Zabokritski |
| 2008/0288471 A1 | 11/2008 | Wu et al. |
| 2008/0294678 A1 | 11/2008 | Gorman et al. |
| 2009/0006150 A1 | 1/2009 | Prigge et al. |
| 2009/0007056 A1 | 1/2009 | Prigge et al. |
| 2009/0018940 A1 | 1/2009 | Wang et al. |
| 2009/0027418 A1 | 1/2009 | Maru et al. |
| 2009/0031247 A1 | 1/2009 | Walter et al. |
| 2009/0044279 A1 | 2/2009 | Crawford et al. |
| 2009/0076845 A1 | 3/2009 | Bellin et al. |
| 2009/0083184 A1 | 3/2009 | Eisen |
| 2009/0094166 A1 | 4/2009 | Aymeloglu et al. |
| 2009/0100018 A1 | 4/2009 | Roberts |
| 2009/0106242 A1 | 4/2009 | McGrew et al. |
| 2009/0106308 A1 | 4/2009 | Killian et al. |
| 2009/0115786 A1 | 5/2009 | Shimasaki et al. |
| 2009/0132953 A1 | 5/2009 | Reed et al. |
| 2009/0144747 A1 | 6/2009 | Baker |
| 2009/0158185 A1 | 6/2009 | Lacevic et al. |
| 2009/0161147 A1 | 6/2009 | Klave |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0187548 A1 | 7/2009 | Ji et al. |
| 2009/0192957 A1 | 7/2009 | Subramanian et al. |
| 2009/0193050 A1 | 7/2009 | Olson |
| 2009/0199090 A1 | 8/2009 | Poston et al. |
| 2009/0228507 A1 | 9/2009 | Jain et al. |
| 2009/0248721 A1 | 10/2009 | Burton et al. |
| 2009/0265105 A1 | 10/2009 | Davis et al. |
| 2009/0271435 A1 | 10/2009 | Yako et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0313250 A1 | 12/2009 | Folting et al. |
| 2009/0313311 A1 | 12/2009 | Hoffmann et al. |
| 2009/0315679 A1 | 12/2009 | Bauchot et al. |
| 2009/0319418 A1 | 12/2009 | Herz |
| 2009/0327157 A1 | 12/2009 | Dunne |
| 2010/0011282 A1 | 1/2010 | Dollard et al. |
| 2010/0036831 A1 | 2/2010 | Vemuri et al. |
| 2010/0070464 A1 | 3/2010 | Aymeloglu et al. |
| 2010/0070489 A1 | 3/2010 | Aymeloglu et al. |
| 2010/0070531 A1 | 3/2010 | Aymeloglu et al. |
| 2010/0070897 A1 | 3/2010 | Aymeloglu et al. |
| 2010/0076939 A1 | 3/2010 | Iwaki et al. |
| 2010/0076968 A1 | 3/2010 | Boyns et al. |
| 2010/0077483 A1 | 3/2010 | Stolfo et al. |
| 2010/0082541 A1 | 4/2010 | Kottomtharayil |
| 2010/0106420 A1 | 4/2010 | Mattikalli et al. |
| 2010/0114817 A1 | 5/2010 | Broeder et al. |
| 2010/0114831 A1 | 5/2010 | Gilbert et al. |
| 2010/0122152 A1 | 5/2010 | Chamberlain et al. |
| 2010/0125470 A1 | 5/2010 | Chisholm |
| 2010/0125546 A1 | 5/2010 | Barrett et al. |
| 2010/0138842 A1 | 6/2010 | Balko et al. |
| 2010/0145902 A1 | 6/2010 | Boyan et al. |
| 2010/0145909 A1 | 6/2010 | Ngo |
| 2010/0161688 A1 | 6/2010 | Kesselman et al. |
| 2010/0162371 A1 | 6/2010 | Geil |
| 2010/0191884 A1 | 7/2010 | Holenstein et al. |
| 2010/0199167 A1 | 8/2010 | Uematsu et al. |
| 2010/0204983 A1 | 8/2010 | Chung et al. |
| 2010/0211550 A1 | 8/2010 | Daniello et al. |
| 2010/0211618 A1 | 8/2010 | Anderson et al. |
| 2010/0235606 A1 | 9/2010 | Oreland et al. |
| 2010/0235915 A1 | 9/2010 | Memon et al. |
| 2010/0283787 A1 | 11/2010 | Hamedi et al. |
| 2010/0293174 A1 | 11/2010 | Bennett et al. |
| 2010/0306029 A1 | 12/2010 | Jolley |
| 2010/0306285 A1 | 12/2010 | Shah et al. |
| 2010/0325581 A1 | 12/2010 | Finkelstein et al. |
| 2011/0029498 A1 | 2/2011 | Ferguson et al. |
| 2011/0041084 A1 | 2/2011 | Karam |
| 2011/0047159 A1 | 2/2011 | Baid et al. |
| 2011/0060753 A1 | 3/2011 | Shaked et al. |
| 2011/0074811 A1 | 3/2011 | Hanson et al. |
| 2011/0087519 A1 | 4/2011 | Fordyce, III et al. |
| 2011/0090254 A1 | 4/2011 | Carrino et al. |
| 2011/0131547 A1 | 6/2011 | Elaasar |
| 2011/0167105 A1 | 7/2011 | Ramakrishnan et al. |
| 2011/0167493 A1 | 7/2011 | Song et al. |
| 2011/0170799 A1 | 7/2011 | Carrino et al. |
| 2011/0173093 A1 | 7/2011 | Psota et al. |
| 2011/0173619 A1 | 7/2011 | Fish |
| 2011/0179042 A1 | 7/2011 | Aymeloglu et al. |
| 2011/0208724 A1 | 8/2011 | Jones et al. |
| 2011/0213791 A1 | 9/2011 | Jain et al. |
| 2011/0231223 A1 | 9/2011 | Winters |
| 2011/0238510 A1 | 9/2011 | Rowen et al. |
| 2011/0238570 A1 | 9/2011 | Li et al. |
| 2011/0258216 A1 | 10/2011 | Supakkul et al. |
| 2011/0258242 A1 | 10/2011 | Eidson et al. |

(56) References Cited

U.S. PATENT DOCUMENTS

| | | |
|---|---|---|
| 2011/0270812 A1 | 11/2011 | Ruby |
| 2011/0270871 A1 | 11/2011 | He et al. |
| 2011/0291851 A1 | 12/2011 | Whisenant |
| 2011/0307382 A1 | 12/2011 | Siegel et al. |
| 2012/0010812 A1 | 1/2012 | Thompson |
| 2012/0016849 A1 | 1/2012 | Garrod et al. |
| 2012/0030140 A1 | 2/2012 | Aymeloglu et al. |
| 2012/0066166 A1 | 3/2012 | Curbera et al. |
| 2012/0078595 A1 | 3/2012 | Balandin et al. |
| 2012/0084135 A1 | 4/2012 | Nissan et al. |
| 2012/0084866 A1 | 4/2012 | Stolfo |
| 2012/0101952 A1 | 4/2012 | Raleigh et al. |
| 2012/0102022 A1 | 4/2012 | Miranker et al. |
| 2012/0110674 A1 | 5/2012 | Belani et al. |
| 2012/0144335 A1 | 6/2012 | Abeln et al. |
| 2012/0150791 A1 | 6/2012 | Willson |
| 2012/0173381 A1 | 7/2012 | Smith |
| 2012/0188252 A1 | 7/2012 | Law |
| 2012/0191446 A1 | 7/2012 | Binsztok et al. |
| 2012/0196558 A1 | 8/2012 | Reich et al. |
| 2012/0206469 A1 | 8/2012 | Hulubei et al. |
| 2012/0215898 A1 | 8/2012 | Shah et al. |
| 2012/0221580 A1 | 8/2012 | Barney |
| 2012/0246148 A1 | 9/2012 | Dror |
| 2012/0290506 A1 | 11/2012 | Muramatsu et al. |
| 2012/0290879 A1 | 11/2012 | Shibuya et al. |
| 2012/0304150 A1* | 11/2012 | Leithead et al. .............. 717/115 |
| 2012/0310831 A1 | 12/2012 | Harris et al. |
| 2012/0310838 A1 | 12/2012 | Harris et al. |
| 2012/0323888 A1 | 12/2012 | Osann, Jr. |
| 2012/0330973 A1 | 12/2012 | Ghuneim et al. |
| 2013/0006668 A1 | 1/2013 | Van Arkel et al. |
| 2013/0006947 A1 | 1/2013 | Akinyemi et al. |
| 2013/0021445 A1 | 1/2013 | Cossette-Pacheco et al. |
| 2013/0024307 A1 | 1/2013 | Fuerstenberg et al. |
| 2013/0024339 A1 | 1/2013 | Choudhuri et al. |
| 2013/0046842 A1 | 2/2013 | Muntz et al. |
| 2013/0061169 A1 | 3/2013 | Pearcy et al. |
| 2013/0067017 A1 | 3/2013 | Carriere et al. |
| 2013/0073377 A1 | 3/2013 | Heath |
| 2013/0076732 A1 | 3/2013 | Cervelli et al. |
| 2013/0091084 A1 | 4/2013 | Lee |
| 2013/0097130 A1 | 4/2013 | Bingol et al. |
| 2013/0097482 A1 | 4/2013 | Marantz et al. |
| 2013/0100134 A1 | 4/2013 | Cervelli et al. |
| 2013/0124193 A1 | 5/2013 | Holmberg |
| 2013/0132348 A1 | 5/2013 | Garrod |
| 2013/0160120 A1 | 6/2013 | Malaviya et al. |
| 2013/0191336 A1 | 7/2013 | Ducott et al. |
| 2013/0191338 A1 | 7/2013 | Ducott, III et al. |
| 2013/0198565 A1 | 8/2013 | Mancoridis et al. |
| 2013/0198624 A1 | 8/2013 | Aymeloglu et al. |
| 2013/0211985 A1 | 8/2013 | Clark et al. |
| 2013/0231862 A1 | 9/2013 | Delling et al. |
| 2013/0232045 A1 | 9/2013 | Tai et al. |
| 2013/0232220 A1 | 9/2013 | Sampson |
| 2013/0262527 A1 | 10/2013 | Hunter et al. |
| 2013/0275446 A1 | 10/2013 | Jain et al. |
| 2013/0286601 A1 | 10/2013 | Shin et al. |
| 2013/0290011 A1 | 10/2013 | Lynn et al. |
| 2013/0290161 A1 | 10/2013 | Aymeloglu et al. |
| 2013/0290825 A1 | 10/2013 | Arndt et al. |
| 2013/0318060 A1 | 11/2013 | Chang et al. |
| 2013/0318594 A1 | 11/2013 | Hoy et al. |
| 2013/0339218 A1 | 12/2013 | Subramanian et al. |
| 2014/0006109 A1 | 1/2014 | Callioni et al. |
| 2014/0012796 A1 | 1/2014 | Petersen et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |

FOREIGN PATENT DOCUMENTS

| | | |
|---|---|---|
| EP | 1566758 A1 | 8/2005 |
| EP | 2551799 A2 | 1/2013 |
| EP | 2575107 A2 | 3/2013 |
| EP | 2634745 A1 | 4/2013 |
| GB | 2366498 A | 3/2002 |
| WO | 95/32424 A1 | 11/1995 |
| WO | 03/060751 A1 | 7/2003 |
| WO | 2005/013200 A1 | 2/2005 |
| WO | 2008/064207 A2 | 5/2008 |
| WO | 2008/121499 A2 | 10/2008 |
| WO | 2009/042548 A1 | 4/2009 |
| WO | 2009/051987 A1 | 4/2009 |
| WO | 2010/030913 A2 | 3/2010 |
| WO | 2010/030915 A2 | 3/2010 |
| WO | 2010/030919 A2 | 3/2010 |
| WO | 2010/030946 A2 | 3/2010 |
| WO | 2011/017289 A2 | 2/2011 |
| WO | 2011/071833 A1 | 6/2011 |
| WO | 2012/079836 A1 | 6/2012 |
| WO | 2013/067077 A1 | 5/2013 |
| WO | 2013/126281 A1 | 8/2013 |

OTHER PUBLICATIONS

T. Nivas, Test harness and script design principles for automated testing of non-GUI or web based applications, Jun. 2011, 8 pages.*

BackTult—JD Edwards One World Version Control System, eKin Systems, Inc., May 8, 2013 (1 page).

Klemmer et al., "Where Do Web Sites Come From? Capturing and Interacting with Design History", Association for Computing Machinery, CHI 2002, Apr. 20-25, 2002 (8 pages).

Kokossis,P. Sujoy, "D7—Dynamic Ontology Management System (Design)", Version 1.0, Information Societies Technology (IST) Programme, h-TechSight, IST-2001-33174, Jan. 10, 2002, pp. 1-27.

Miklau et al, "Security history: Privacy and accountability in database systems", 3rd Biennial Conference on Innovative Data Systems Research (CIDR), Jan. 7-10, 2007, Asilomar, California, pp. 387-396.

Niepert et al., "A Dynamic Ontology for a Dynamic Reference Work", Joint Conference on Digital Libraries, Jun. 17-22, 2007, Vancouver, British Columbia, Canada (10 pages).

PCT International Search Report and Written Opinion mailed May 22, 2008, issued in International Application No. PCT/US07/085202 (8 pages).

KiteSchema, https://docs.palantir.com/gotham/3.11.1.0/dataguide/baggage/KiteSchema, accessed online on Aug. 30, 2013 (1 page).

Kite—Synopsis and Description, https://docs.palantir.com/gotham/3.11.1.0/adminreference/datasources.11, accessed online on Aug. 30, 2013 (2 pages).

The repository Element, https://docs.palantir.com/gotham/3.11.1.0/dataguide/kite_config_file.04, accessed online on Aug. 30, 2013 (2 pages).

Write a Kite Configuration File in Eclipse, Palantir Technologies, Inc., 2010 (2 pages).

Kite Operations, Palantir Technologies, Inc., 2010 (1 page).

Extracting and Transforming Data with Kite, Palantir Technologies, Inc., 2010 (38 pages).

Kite Data Integration Process Overview, Palantir Technologies, Inc., 2010 (48 pages).

"A First Look: Predicting Market Demand for Food Retail using a Huff Analysis," TRF Policy Solutions, Jul. 2012 (30 pages).

Acklen, Laura, "Absolute Beginners Guide to Microsoft Word 2003," Dec. 24, 2003, pp. 15-18, 34-41, 308-316.

Ananiev et al., "The New Modality API," http://web.archive.org/web/20061211011958/http://java.sun.com/developer/technicalArticles/J2SE/Desktop/javase6/modality/, Jan. 2006 (8 pages).

"Andy Turners Gisruk 2012 Notes" <https://docs.google.com/document/d/1cTmxg7mVx5gd89lqblCYvCEnHA4QAivH4I4WpyPsqE4/edit?pli=1>; accessed online on Sep. 16, 2013 (15 pages).

(56) References Cited

OTHER PUBLICATIONS

Anonymous, "A Real-World Problem of Matching Records," Nov. 2006, <http://grupoweb.upf.es/bd-web/slides/ullman.pdf> (16 pages).
Anonymous, "Frequently Asked Questions about Office Binder 97," accessed online at http://web.archive.org/web/20100210112922/http://support.microsoft.com/kb/843147, Dec. 18, 2006 (5 pages).
Appacts, "Smart Thinking for Super Apps,", http://www.appacts.com, accessed online on Jul. 18, 2013 (4 pages).
Apsalar, "Data Powered Mobile Advertising," "Free Mobile App Analytics" and various analytics related screen shots, http://apsalar.com, accessed online on Jul. 18, 2013 (8 pages).
Bae et al., "Partitioning Algorithms for the Computation of Average Iceberg Queries," DaWaK 2000, LNCS 1874, 2000, pp. 276-286.
Baker et al., "Megastore: Providing Scalable, Highly Available Storage for Interactive Services," 5th Biennial Conference on Innovative Data Systems Research (CIDR '11), Jan. 9-12, 2011, Asilomar, California (12 pages).
Barnes et al., "Viewshed Analysis", GIS-ARC/Info 2001, <www.evsc.virginia.edu/~jhp7e/evsc466/student_pres/Rounds.pdf> (10 pages).
Bernstein et al., "Hyder—A Transactional Record Manager for Shared Flash," 5th Biennial Conference on Innovative Data Systems Research (CIDR '11), Jan. 9-12, 2011, Asilomar, California (12 pages).
Bradbard, Matthew, "Technical Analysis Applied," <http://partners.futuresource.com/fastbreak/2007/0905.htm>, Sep. 5, 2007 (6 pages).
Bugzilla@Mozilla, "Bug 18726—[feature] Long-click means of invoking contextual menus not supported," http://bugzilla.mozilla.org/show_bug.cgi?id=18726, accessed online on Jun. 13, 2013, (11 pages).
Capptain—Pilot Your Apps, <http://www.capptain.com, accessed online on Jul. 18, 2013 (6 pages).
Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012 (6 pages).
Chang et al., "Bigtable: A Distributed Storage System for Structured Data", Google, Inc., OSDI'06: Seventh Symposium on Operating System Design and Implementation, Seattle, WA, Nov. 2006 (14 pages).
Chen et al., "Bringing Order to the Web: Automatically Categorizing Search Results," CHI '00, Proceedings of the SIGCHI conference on Human Factors in Computing Systems, 2000 (9 pages).
Countly Mobile Analytics, <http://count.ly/>, accessed online on Jul. 18, 2013 (9 pages).
Devanbu et al., "Authentic Third-party Data Publication," 2000, http://www.cs.ucdavis.edu/~devanbu/authdbpub.pdf (19 pages).
Distimo—App Analytics, <http://www.distimo.com/app-analytics>, accessed online on Jul. 18, 2013 (5 pages).
Donjerkovic et al., "Probabilistic Optimization of Top N Queries," Proceedings of the 25th VLDB Conference, Edinburgh, Scotland, 1999, pp. 411-422.
Dramowicz, Ela, "Retail Trade Area Analysis Using the Huff Model," Directions Magazine, Jul. 2, 2005, http://www.directionsmag.com/articles/retail-trade-area-analysis-using-the-huff-model/123411, accessed online on Dec. 4, 2013 (10 pages).
Dreyer et al., "An Object-Oriented Data Model for a Time Series Management System," Proceedings of the 7th International Working Conference on Scientific and Statistical Database Management, Charlottesville, Virginia USA, Sep. 28-30, 1994 (12 pages).
Fang et al., "Computing Iceberg Queries Efficiently," Proceedings of the 24th VLDB Conference New York USA, 1998, pp. 299-310.
Flurry Analytics, <http://www.flurry.com/>, accessed online on Jul. 18, 2013 (14 pages).
Geiger, Jonathan G., "Data Quality Management, The Most Critical Initiative You Can Implement," Data Warehousing, Management and Quality, Paper 098-29, SUGI 29, Intelligent Solutions, Inc., Bounder, CO; accessed online on Oct. 3, 2013 (14 pages).
Ghosh, P., "A Solution of Polygon Containment, Spatial Planning, and Other Related Problems Using Minkowski Operations," Computer Vision, Graphics, and Image Processing, 1990, vol. 49, pp. 1-35.
GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html (2 pages).
Google Analytics Official Website—Web Analytics & Reporting, <http://www.google.com/analytics.index.html>, accessed online on Jul. 18, 2013 (22 pages).
Gu et al., "Record Linkage: Current Practice and Future Directions," Jan. 15, 2004 (32 pages).
Han et al., "Efficient Computation of Iceberg Cubes with Complex Measures," ACM SIGMOD, May 21-24, 2001 (12 pages).
Haralick et al., "Image Analysis Using Mathematical Morphology," Pattern Analysis and Machine Intelligence, IEEE Transactions, Jul. 1987, vol. PAMI-9, No. 4, pp. 532-550.
Hibbert et al., "Prediction of Shopping Behavior Using a Huff Model Within a GIS Framework," Healthy Eating in Context, Mar. 18, 2011 (16 pages).
Huff et al., "Calibrating the Huff Model Using ArcGIS Business Analyst," ESRI, Sep. 2008 (33 pages).
Huff, David L., "Parameter Estimation in the Huff Model," ESRI, ArcUser, Oct.-Dec. 2003, pp. 34-36.
Ipbucker, C., "Inverse Transformation for Several Pseudo-cylindrical Map Projections Using Jacobian Matrix," ICCSA 2009, Part 1 LNCS 5592, pp. 553-564.
Karp et al., "A Simple Algorithm for Finding Frequent Elements in Streams and Bags," ACM Transactions on Database Systems, vol. 28, No. 1, Mar. 2003, pp. 51-55.
Kontagent Mobile Analytics, <http://www.kontagent.com/>, accessed online on Jul. 18, 2013 (9 pages).
Leela et al., "On Incorporating Iceberg Queries in Query Processors," Technical Report, TR-2002-01, Database Systems for Advanced Applications Lecture Notes in Computer Science, 2004, vol. 2973 (25 pages).
Levine, N., "Crime Mapping and the Crimestat Program," Geographical Analysis, 2006, vol. 38, pp. 41-56.
Litwin et al., "Multidatabase Interoperability," IEEE Computer, Dec. 1986, vol. 19, No. 12, pp. 10-18. <http://www.lamsade.dauphine.fr/~litwin/mdb-interoperability.pdf>.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14 (8 pages).
Liu et al., "Methods for Mining Frequent Items in Data Streams: An Overview," Knowledge and Information Systems, vol. 26, No. 1, Jan. 2011, pp. 1-30.
Localytics—Mobile App Marketing & Analytics, <http://www.localytics.com/>, accessed online on Jul. 18, 2013 (12 pages).
Mandagere, Nagapramod, "Buffer Operations in GIS," <http://www-users.cs.umn.edu/~npramod/enc_pdf.pdf> retrieved Jan. 28, 2010 (7 pages).
Manske, "File Saving Dialogs," <http://www.mozilla.org/editor/ui_specs/FileSaveDialogs.html>, Jan. 20, 1999 (7 pages).
Map Builder, "Rapid Mashup Development Tool for Google and Yahoo Maps!" <http://web.archive.org/web/20090626224734/http://www.mapbuilder.net/> printed Jul. 20, 2012 (2 pages).
Map of San Jose, CA. Retrieved Oct. 2, 2013 from http://maps.google.com (1 page).
Map of San Jose, CA. Retrieved Oct. 2, 2013 from http://maps.bing.com (1 page).
Map of San Jose, CA. Retrieved Oct. 2, 2013 from http://maps.yahoo.com (1 page).
Mentzas et al. "An Architecture for Intelligent Assistance in the Forecasting Process," Proceedings of the Twenty-Eighth Hawaii International Conference on System Sciences, Jan. 3-6, 1995, vol. 3, pp. 167-176.
Microsoft—Developer Network, "Getting Started with VBA in Word 2010," Apr. 2010, <http://msdn.microsoft.com/en-us/library/ff604039%28v=office.14%29.aspx>, accessed online on Apr. 4, 2014 (17 pages).

(56) References Cited

OTHER PUBLICATIONS

Mixpanel—Mobile Analytics, <https://mixpanel.com/>, accessed online on Jul. 18, 2013 (13 pages).
Murray, C., Oracle Spatial Developers Guide—6 Coordinate Systems (Spatial Reference Systems), <http://docs.oracle.com/cd/B28359_01/appdev.111/b28400.pdf>, Jun. 2009 (74 pages).
Microsoft Office—Visio, "About connecting shapes," <http://office.microsoft.com/en-us/visio-help/about-connecting-shapes-HP085050369.aspx>, accessed online on Aug. 4, 2011 (6 pages).
Microsoft Office—Visio, "Add and glue connectors with the Connector tool," <http://office.microsoft.com/en-us/visio-help/add-and-glue-connectors-with-the-connector-tool-HA010048532.aspx?CTT=1>, accessed online on Aug. 4, 2011 (1 page).
Nadeau et al., "A Survey of Named Entity Recognition and Classification," Jan. 15, 2004 (20 pages).
Nin et al., "On the Use of Semantic Blocking Techniques for Data Cleasnsing and Integration," 11th International Database Engineering and Applications Symposium, 2007 (9 pages).
Open Street Map, "Amm's Diary:Unconnected ways and other data quality issues," http://www.openstreetmap.org/user/amm/diary; accessed online on Jul. 23, 2012 (3 pages).
Open Web Analytics (OWA), <http://www.openwebanalytics.com/>, accessed online on Jul. 19, 2013 (5 pages).
Peng et al., "Large-scale Incremental Processing Using Distributed Transactions and Notifications" Proceedings of the 9th USENIX Symposium on Operating Systems Design and Implementation, USENIX, 2010 (14 pages).
Piwik—Free Web Analytics Software, <http://piwik.org/>, accessed online on Jul. 19, 2013 (18 pages).
POI Editor, "How to: Create Your Own Points of Interest," <http://www.poieditor.com/articles/how_to_create_your_own_points_of_interest/>; accessed online on Jul. 22, 2012 (4 pages).
Pozzi et al., "Vegetation and Population Density in Urban and Suburban Areas in the U.S.A." Third International Symposium of Remote Sensing of Urban Areas Istanbul, Turkey, Jun. 2002 (8 pages).
Qiang et al., "A Mutual-Information-Based Approach to Entity Reconciliation in Heterogeneous Databases," Proceedings of 2008 Internation Conference on Computer Science & Software Engineering, IEEE Computer Society, New York, NY, Dec. 12-14, 2008, pp. 666-669.
Qiu, Fang, "3d Analysis and Surface Modeling", <http://web.archive.org/web/20091202221925/http://www.utsa.edu/lrsg/Teaching/EES6513/08-3D.pdf>; accessed online on Sep. 16, 2013 (26 pages).
Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pdf>.
Reedy, Sarah, "Policy and Charging Rules Function (PCRF)," Sep. 13, 2010, http://www.lightreading.com/document.asp?doc_id=680015; accessed online on Dec. 10, 2013 (4 pages).
Reibel et al., "Areal Interpolation of Population Counts Using Preclassified Land Cover Data," Population Research and Policy Review, 2007, vol. 26, pp. 619-633.
Reibel, M., "Geographic Information Systems and Spatial Data Processing in Demography: a Review," Population Research and Policy Review, 2007, vol. 26, pp. 601-618.
Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.
Sekine et al., "Definition, Dictionaries and Tagger for Extended Named Entity Hierarchy," May 2004, pp. 1977-1980.
Shah, Chintan, "Periodic Connections to Control Server Offer New Way to Detect Botnets," Oct. 24, 2013, <http://www.blogs.mcafee.com/mcafee-labs/periodic-links-to-control-server-offer-new-way-to-detect-botnets> (6 pages).
Snyder, "Map Projections—A Working Manual," U.S. Geological Survey Professional paper 1395, United States Government Printing Office, Washington: 1987, pp. 11-21 and 60-70.

Sonris, "Using the Area of Interest Tools," <http://web.archive.org/web/20061001053327/http://sonris-www.dnr.state.la.us/gis/instruct_files/tutslide12>; accessed online on Jan. 3, 2013 (1 page).
StatCounter—Free Invisible Web Tracker, Hit Counter and Web Stats, <http://statcounter.com/>, accessed online on Jul. 19, 2013 (17 pages).
Tangelder et al., "Freeform Shape Matching Using Minkowski Operations," The Netherlands, Jun. 1996 (12 pages).
TestFlight—Beta Testing on the Fly, <http://testflightapp.com/> Printed Jul. 18, 2013 in 3 pages.
Thomson et al., "The Case for Determinism in Database Systems," The 36th International Conference on Very Large Data Bases, Sep. 13-17, 2010, Singapore, Proceedings of the VLDB Endowment, vol. 3, No. 1 (11 pages).
trak.io, <http://trak.io/>, accessed online on Jul. 18, 2013 (3 pages).
UserMetrix, <http://usermetrix.com/android-analytics/>, accessed online on Jul. 18, 2013 (3 pages).
VB Forums, "Buffer a Polygon," Internet Citation, <http://www.vbforums.com/showthread.php?198436-Buffer-a-Polygon>, Specifically Thread #1, #5 & #11; accessed online on May 2, 2013 (8 pages).
Vivid Solutions, "JTS Topology Suite: Technical Specifications," <http://www.vividsolutions.com/jts/bin/JTS%20Technical%20Specs.pdf> Version 1.4, 2003 (36 pages).
Wagner et al., "Dynamic Shortest Paths Containers," Electronic Notes in Theoretical Computer Science, vol. 92, No. 1, 2003 (19 pages).
Wikipedia, "Ramer—Douglas—Peucker Algorithm," <http://en.wikipedia.org/wiki/Ramer%E2%80%93Douglas%E2%80%93Peucker_algorithm> printed Jul. 2011 (3 pages).
Wikipedia, "Douglas—Peucker—Algorithms," <http://de.wikipedia.org/w/index.php?title=Douglas-Peucker-Algorithmus&oldid=91846042> printed Jul. 2011 (2 pages).
Wollrath et al., "A Distributed Object Model for the Java System," Conference on Object-Oriented Technologies and Systems, Jun. 17-21, 1996, pp. 219-231.
Woodbridge, Stephen, "[geos-devel] Polygon simplification," <http://lists.osgeo.org/pipermail/geos-devel/2011-May/005210.html> dated May 8, 2011 (3 pages).
Yahoo, <http://web.archive.org/web/20020124161606/http://finance.yahoo.com/q?s=%5eIXIC&d=c...>; accessed online on Mar. 6, 2012 (2 pages).
Zhao et al., "Entity Matching Across Heterogeneous Data Sources: An Approach Based on Constrained Cascade Generalization," Data & Knowledge Engineering, vol. 66, No. 3, Sep. 2008, pp. 368-381.
Griffith, Daniel A., "A Generalized Huff Model," Geographical Analysis, Apr. 1982, vol. 14, No. 2, pp. 135-144.
New Zealand First Examination Report dated Mar. 20, 2014, issued in New Zealand Application No. 622389, (2 pages).
New Zealand First Examination Report dated Mar. 20, 2014, issued in New Zealand Application No. 622404, (2 pages).
New Zealand First Examination Report dated Apr. 2, 2014, issued in New Zealand Application No. 622484, (2 pages).
A Tour of Pinboard, <https://pinboard.in/tour/>, accessed online on May 15, 2014 (6 pages).
Delicious, <https://delicious.com/>, accessed online on May 15, 2014 (1 page).
Kahan et al., "Annotea: an open RDF infrastructure for shared Web annotations", Computer Networks, vol. 39, 2002, pp. 589-608.
Extended European Search Report dated Jul. 31, 2014, issued in European Application No. 14159629.6, (7 pages).
Examination Report dated Aug. 12, 2014, issued in UK Application No. 1404479.6, (7 pages).
Extended European Search Report dated Jun. 3, 2014, issued in European Application No. 14158958.0, (11 pages).
Extended European Search Report dated Jun. 10, 2014, issued in European Application No. 114158977.0, (10 pages).
Johnson, Maggie, "Introduction to yacc and bison", Handout 13, Jul. 8, 2005, pp. 1-11, retrieved from the Internet: http://staff.science.uva.nl/~andy/compiler/yacc-intro.pdf on May 5, 2014.
First Examination Report dated Mar. 26, 2014, issued in New Zealand Application No. 622497, (3 pages).

(56) References Cited

OTHER PUBLICATIONS

Further Examination Report dated Jun. 19, 2014, issued in New Zealand Application No. 622497, (2 pages).
Examination Report dated Mar. 22, 2011, issued in Australian Application No. 2007323689 (3 pages).
Examination Report dated Jun. 4, 2012, issued in Canadian Application No. 2,666,364 (2 pages).
Examination Report dated Oct. 3, 2013, issued in Canadian Application No. 2,666,364 (2 pages).
Palantir, https://docs.palantir.com/gotham/3.11.1.0/dataguide/baggage/KiteSchema.xsd, printed on Apr. 4, 2014 (4 pages).
Palermo, Christopher J., "Memorandum," [Disclosure relating to U.S. Appl. No. 13/916,447, filed Jun. 12, 2013, and related applications], Jan. 31, 2014 (3 pages).

\* cited by examiner

Configuration File
300

```xml
<?xml version="1.0" encoding="UTF-8"?>
<beans xmlns="http://www.springframework.org/schema/beans"
    xmlns:xsi="http://www.w3.org/2001/XMLSchema-instance" xmlns:lang="http://www.springframework.org/schema/lang"
    xmlns:context="http://www.springframework.org/schema/context"
    xsi:schemaLocation="http://www.springframework.org/schema/beans
    http://www.springframework.org/schema/beans/spring-beans-3.0.xsd
    http://www.springframework.org/schema/context
    http://www.springframework.org/schema/context/spring-context-3.0.xsd
    http://www.springframework.org/schema/lang
    ">

<!-- Directory to output serialized files -->
    <bean id="outputDirectory" class="java.io.File">
        <constructor-arg value="${user.home}/KeaExamplesOutput" />
    </bean>
    <!-- Number of directory levels for serialized output -->
    <bean id="directoryLevels" class="java.lang.Integer">
        <constructor-arg value="0" />
    </bean>
    <!-- Ontology file to use -->
    <bean id="ontologyFile" class="java.io.File">          ———— Ontology File
        <constructor-arg value="default.ont" />                        310
    </bean>

</beans>
```

FIG. 3

PhoneTransformer.groovy : transform

Transform Method
400

```groovy
1    /*
2     * performs the actual transform of the phone data
3     */
4    @Override
5    public void transform(final TransformerContext context, final ContentProvider provider) throws
6    Exception {
7
8        // prompt the user for whether to aggregate calls or
9        // show them individually
10       CallImportOptions option = showTransformOptionDialog()
11
12       // link builder determines how calls are aggregated
13       Closure linkBuilder;
14       switch(option){
15           case CallImportOptions.aggregate:
16               linkBuilder = { builder, phoneCall, phoneFrom, phoneTo, personTo ->
17       createAggregateCallLinks(builder, phoneCall, phoneFrom, phoneTo, personTo)}
18               break;
19           case CallImportOptions.individual:
20               linkBuilder = { builder, phoneCall, phoneFrom, phoneTo, personTo ->
21       createIndividualCallLinks(builder, phoneCall, phoneFrom, phoneTo, personTo)}
22               break;
23           default:
24               throw new IllegalArgumentException("Unrecognized link option")
25       }
26
27       ContentProcessor<void> processor = new ContentProcessor<void>() {
28           public void process(InputStream inputStream) throws Exception {
29               logger.debug "Processing ${provider.fullName}"
30               try {
31                   process context, provider, inputStream, linkBuilder
32               } catch (Exception e) {
33                   println e.toString()
34                   context.collector.collectError
35       org.codehaus.groovy.runtime.StackTraceUtils.sanitize(e)
36               }
37               return null;
38           }
39       };
40       provider.processContent processor
41   }
```

410 — (points to line 12 area)
420 — (points to line 26 area)

FIG. 4

Link Builder Methods
500

```
Link Builder Methods

1  /* Creates links that will collapse the call events between common endpoints
 2   * onto a single link with a call count property
 3   */
 4  private static def createAggregateCallLinks(GroovyPalantirBuilder builder, def phone_call,
 5      def phoneFrom, def phoneTo, def personTo){
 6      builder.links{
 7          simple(from:phoneFrom, through:phone_call)
 8          simple(through:phone_call, to:phoneTo)
 9          ownerOf(parent:personTo, child:phoneTo)
10      }
11  }
12
13  /* create individual call events for each call between endpoints
14   */
15  private static def createIndividualCallLinks(GroovyPalantirBuilder builder, def phone_call,
16      def phoneFrom, def phoneTo, def personTo){
17      builder.links{
18          simple(parent:phoneFrom, child:phone_call)
19          simple(parent:phone_call, child:phoneTo)
20          ownerOf(parent:personTo, child:phoneTo)
21      }
22  }
```

FIG. 5

Process Method
600

```
process
 1    /*
 2     * process the transform
 3     * @param context
 4     * @param provider
 5     * @param inputStream
 6     * @param linkBuilder - how links are built determines if calls are aggregated or shown as individual
 7     events
 8    */
 9    void process(TransformerContext context, ContentProvider provider, InputStream inputStream, Closure
      linkBuilder) throws IOException, MessagingException {
10      //def builder = getBuilder(context);
11      //buildCalling builder, provider.shortName, inputStream, context
12
13      // create a reader for the given stream
14      def phoneCallReader = new InputStreamReader(inputStream)
15
16      def phoneCallProvider = new CSVRowTransformer(separator: ',') // provides each row of the csv as a
17      map([header_name:value])
18
19      // iterate over the rows of the provider
20      phoneCallProvider.eachRow phoneCallReader, { row ->
21          def builder = createBuilder(context);
22
23          processRow(builder, linkBuilder, row)
24          PalantirPrototype model = builder.createModel()
25          PalantirPrototypeTransformer transformer = new PalantirPrototypeTransformer(context)
26
27          // do the transform into the context
28          transformer.transformAndStore model
29
30      }
31    }
32
33
```

FIG. 6A

Process Method
(continued)
600

```
34   /*
35    * Processes each row with the provided builder
36    * @param builder builder for creating PTOCs from row data
37    * @param buildLinks Closure that will create links according to the user preference for aggregation
38    * @param row current row that is being processed
39    */
40   private static def processRow(GroovyPalantirBuilder builder, Closure buildLinks, row){
41       // create a new builder for each row
42       String uniqueKey = UUID.randomUUID().toString()
43
44       builder.with {
45
46           int totalSeconds = ParseUtils.parseDurationToSeconds(row.duration)
47
48           // clear up the numbers so they are in a common format
49           def targetNumber = PhoneNumber.parsePhoneNumber(row.target)
50           def dialedNumber = PhoneNumber.parsePhoneNumber(row.dialed_number)
51
52           PTTimeInterval timeStamp = ParseUtils.parseTimeInterval(row.date, row.time, row.duration)
53           def start = timeStamp.timeStart
54           def end = timeStamp.timeEnd
55
56           // create a phone call event entity
57           def phone_call = phone_call("$targetNumber calls $dialedNumber",
58               id: "phoneCall_$uniqueKey",
59               externalId:"phoneCall_$uniqueKey",
60               startTime:start, endTime:end)  {
61
62               id_number row.case_number
63
64               phone_number {
65                   country targetNumber.country
66                   area_code targetNumber.area
67                   local targetNumber.local
68               }
69
70               phone_number {
71                   country dialedNumber.country
72                   area_code dialedNumber.area
73                   local dialedNumber.local
74               }
75
76               address{
77                   city row.dialed_city
78                   state row.dialed_state
79               }
80
81               duration {
82                   duration totalSeconds
83                   units "seconds"
84               }
85           }
86
87           def personTo = createPerson(row.dialed_name, builder, row.dialed_city, row.dialed_state);
88           def phoneFrom = createPhone(targetNumber, builder)
89           def phoneTo = createPhone(dialedNumber, builder)
90
91           // call the buildLinks closure to connect the person entities
92           // to their respective phones and the phones to the call event
93           // from this row
94           buildLinks(builder, phone_call, phoneFrom, phoneTo, personTo)
       }
   }
```

FIG. 6B

Psuedo Transformer

DSL Builder
700

```
1   GroovyPalantirBuilder builder = createBuilder(transformContext)
2   builder.with {
3
4
5       def entity1 = entity_display_name("label/name for the entity",   // where entity1 is an object in
6           the ontology "person", "phone_call"
7                                       namedProperty:propertyValue){
8           entityProperty{ // where entityProperty is a property in the ontology e.g. "address",
9           "phone_number"
10              metaData1 value1
11              metaData2 value2
12          }
13          ...  // other properties
14      }
15
16      def entity2 = entity_display_name("label for this entity",
17                                      namedProperty:propertyValue){
18          entityProperty{
19              metaData1 value3
20              metaData2 value4
21          }
22          ...  // other properties
23      }
24
25      // create a link between the entities we created
26      links{
27          linktype parent:entity1 child:event1 // where linkType is the display name of a link in the
28          ontology
29      }
30  }
```

FIG. 7

DATA INTEGRATION TOOL

REFERENCE TO RELATED APPLICATION

This application claims the benefit of priority to U.S. Provisional Patent Application No. 61/801,222, filed on Mar. 15, 2013, the disclosure of which is expressly incorporated herein by reference in its entirety.

BACKGROUND

Data is commonly stored in computer-based systems in fixed, rigidly structured data stores. For example, one common type of data store is a "flat" file such as a spreadsheet, plain-text document, or XML document. Another common type of data store is a relational database comprising one or more tables. Other examples of data stores that comprise structured data include, without limitation, files systems, object collections, record collections, arrays, hierarchical trees, linked lists, stacks, and combinations thereof.

Often, the underlying structure of these types of data stores is poorly suited for data analysis. One approach for facilitating a more efficient analysis of data in such data stores is to reorganize that data according to an object model that defines object structures and relationships between the object structures.

To create an object model, data items in underlying data stores, such as table rows or cells, can be mapped to properties of the objects in the model. The semantics, or "meanings," of the various components of the object model are defined by an ontology that categorizes objects, relationships, and/or properties according to various defined types. For example, an ontology might categorize objects as being of one of the following types: person, entity, or event. The ontology can define different properties for each object type, such as names, dates, locations, documents, media, and so forth. Moreover, the ontology can further define relationships (or links) between objects, such as employee, participant, sibling, and so forth.

BRIEF DESCRIPTION OF THE DRAWINGS

Reference will now be made to the accompanying drawings showing example embodiments of the present application, and in which:

FIG. 3 shows an exemplary configuration file for a project, consistent with embodiments of the present disclosure.

FIG. 4 shows an exemplary transform method of a transformation script, consistent with embodiments of the present disclosure.

FIG. 5 shows exemplary link builder methods of the transform method described in FIG. 4, consistent with embodiments of the present disclosure.

FIGS. 6A and 6B show an exemplary content process method of the transform method described in FIG. 4, consistent with embodiments of the present disclosure.

FIG. 7 shows an exemplary domain-specific language (DSL) builder called by the content processor described in FIGS. 6A and 6B, consistent with embodiments of the present disclosure.

DETAILED DESCRIPTION OF EXEMPLARY EMBODIMENTS

Reference will now be made in detail to the embodiments, the examples of which are illustrated in the accompanying drawings. Whenever possible, the same reference numbers will be used throughout the drawings to refer to the same or like parts.

Figure 1A:
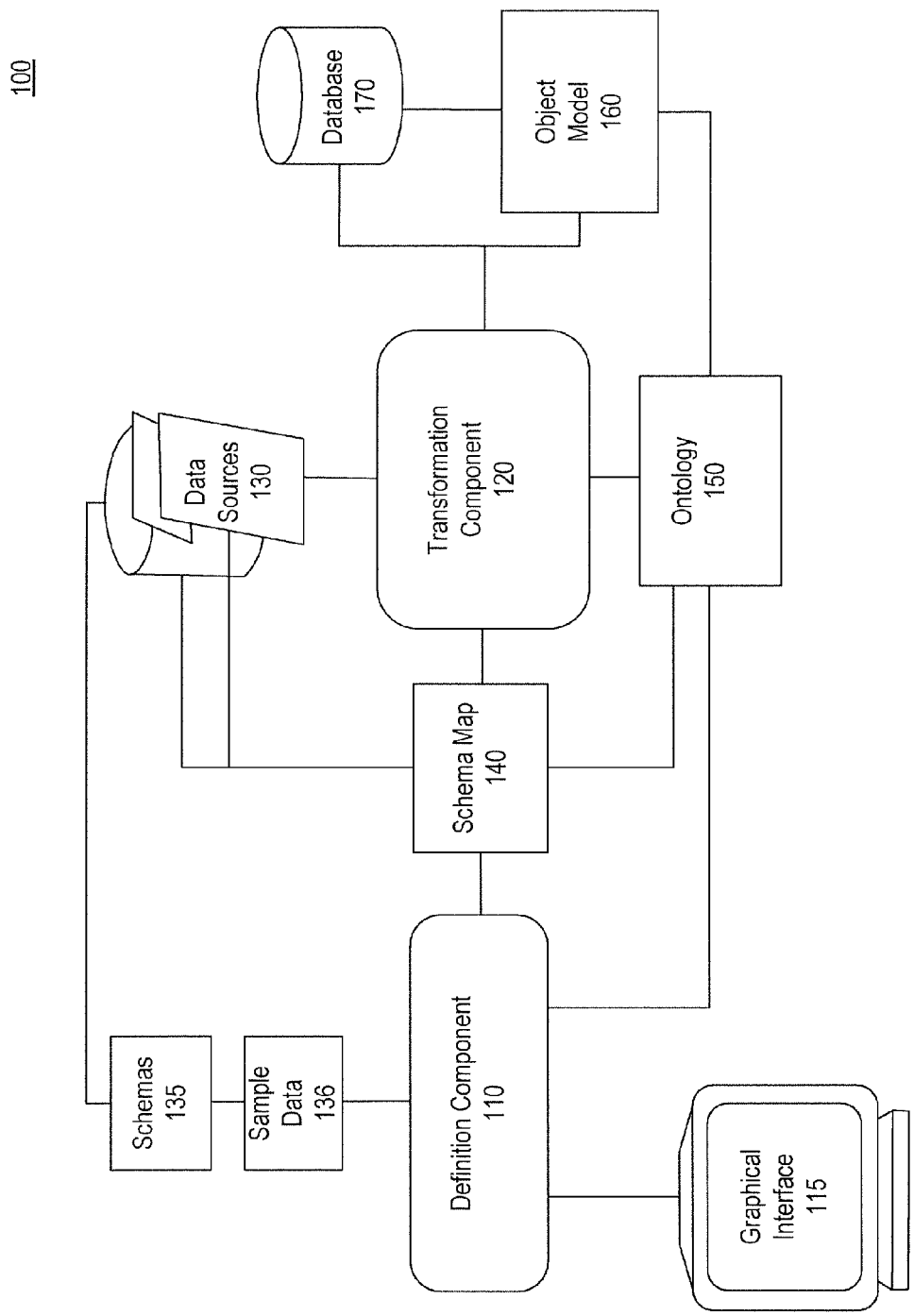
FIG. 1A shows, in block diagram form, an exemplary data fusion system for providing interactive data analysis, consistent with embodiments of the present disclosure.

FIG. 1A shows, in block diagram form, an exemplary data fusion system 100 for providing interactive data analysis, consistent with embodiments of the present disclosure. System 100 can include several components. The components of system 100 can electronically transmit data/information in either direction with other components and can be connected to one another with wired or wireless transmission links and/ or via one or more networks.

Among other things, system 100 facilitates transformation of one or more data sources, such as data sources 130, into an object model 160 whose semantics are defined by an ontology 150. The transformation can be performed for a variety of reasons. For example, a database administrator may desire to import data from data sources 130 into a database 170 for persistently storing object model 160. As another example, a data presentation component (not depicted) can transform input data from data sources 130 on the fly into object model 160. The object model 160 can then be utilized, in conjunction with ontology 150, for analysis through graphs and/or other data visualization techniques.

As shown in FIG. 1A, system 100 comprises a definition component 110 and a translation component 120, both implemented by one or more processors on one or more computing devices executing hardware and/or software-based logic for providing various functionality described herein. As will be appreciated from the present disclosure, system 100 can comprise fewer or additional components that provide various functionalities described herein. Such components are, for clarity, omitted from FIG. 1A. Moreover, the component(s) of system 100 responsible for providing various functionalities can further vary from embodiment to embodiment.

Definition component 110 generates and/or modifies ontology 150 and a schema map 140. Exemplary embodiments for defining an ontology (such as ontology 150) are described in U.S. Pat. No. 7,962,495 (the '495 patent), issued Jun. 14, 2011, the entire contents of which are expressly incorporated herein by reference for all purposes. Among other things, the '495 patent describes embodiments that define a dynamic ontology for use in creating data in a database. For creating a database ontology, one or more object types are created where each object type can include one or more properties. The attributes of object types or property types of the ontology can be edited or modified at any time.

And for each property type, at least one parser definition is created. The attributes of a parser definition can be edited or modified at any time.

In some embodiments, each property type is declared to be representative of one or more object types. A property type is representative of an object type when the property type is intuitively associated with the object type. For example, a property type of "Social Security Number" may be representative of an object type "Person" but not representative of an object type "Business."

In some embodiments, each property type has one or more components and a base type. In some embodiments, a property type may comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is a Name property having a Last Name component and a First Name component. An example of raw input data is "Smith, Jane." An example parser definition specifies an association of imported input data to object property components as follows: {LAST_NAME}, {FIRST_NAME}→Name:Last, Name:First. In some embodiments, the association {LAST_NAME}, {FIRST_NAME} is defined in a parser definition using regular expression symbology. The association {LAST_NAME}, {FIRST_NAME} indicates that a last name string followed by a first name string comprises valid input data for a property of type Name. In contrast, input data of "Smith Jane" would not be valid for the specified parser definition, but a user could create a second parser definition that does match input data of "Smith Jane." The definition Name:Last, Name:First specifies that matching input data values map to components named "Last" and "First" of the Name property.

As a result, parsing the input data using the parser definition results in assigning the value "Smith" to the Name:Last component of the Name property, and the value "Jane" to the Name:First component of the Name property.

Referring again to FIG. 1A, schema map 140 can define how various elements of schemas 135 for data sources 130 map to various elements of ontology 150. Definition component 110 receives, calculates, extracts, or otherwise identifies schemas 135 for data sources 130. Schemas 135 define the structure of data sources 130—for example, the names and other characteristics of tables, files, columns, fields, properties, and so forth. Definition component 110 furthermore optionally identifies sample data 136 from data sources 130. Definition component 110 can further identify object type, relationship, and property definitions from ontology 150, if any already exist. Definition component 110 can further identify pre-existing mappings from schema map 140, if such mappings exist.

Figure 1B:
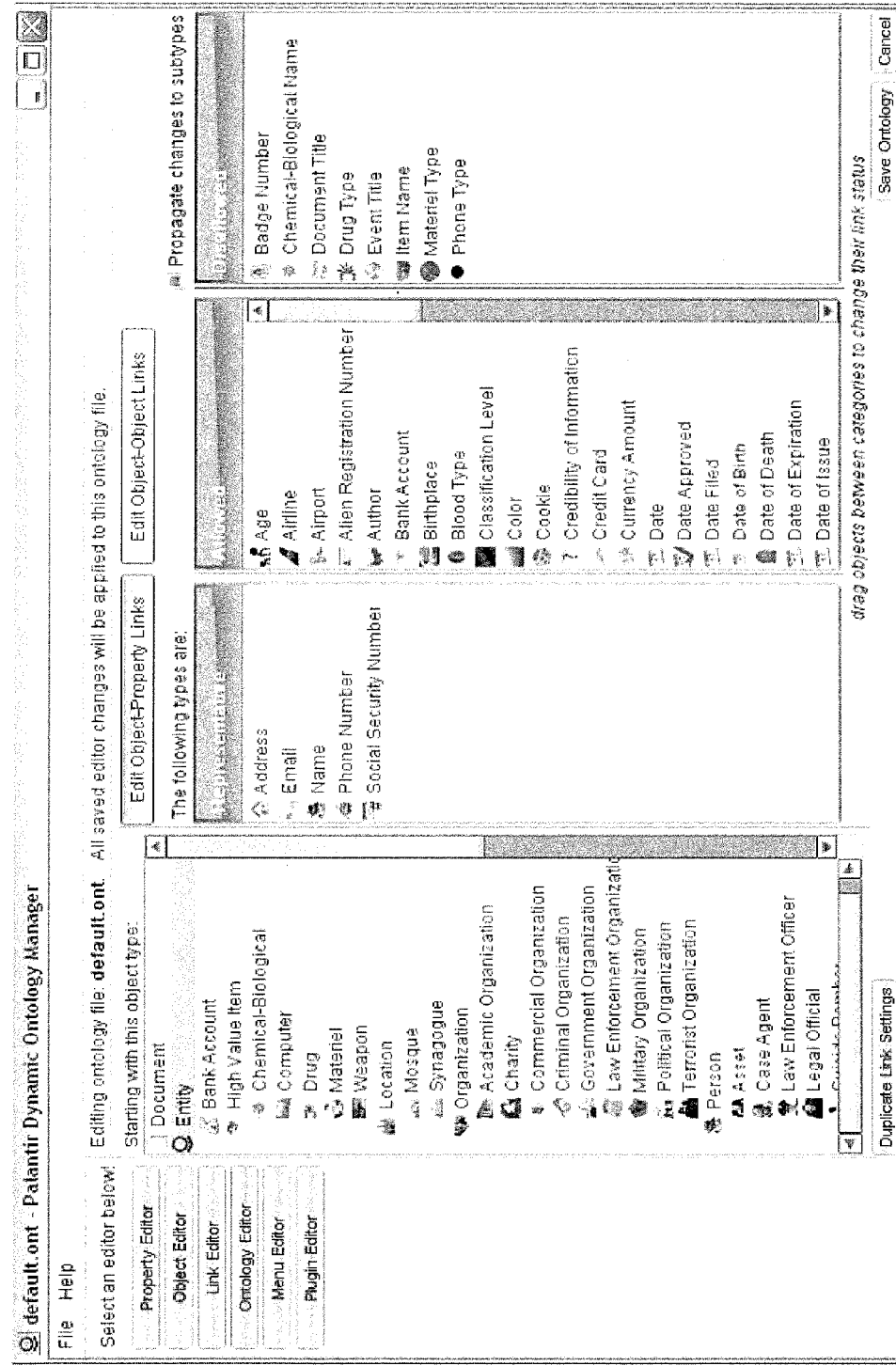
FIG. 1B is a screenshot of an exemplary graphical interface for the data fusion system of FIG. 1A, consistent with embodiments of the present disclosure.

Based on the identified information, definition component 110 can generate a graphical interface 115. Graphical interface 115 can be presented to users of a computing device via any suitable output mechanism (e.g., a display screen, an image projection, etc.), and can further accept input from users of the computing device via any suitable input mechanism (e.g., a keyboard, a mouse, a touch screen interface, etc.). Graphical interface 115 features a visual workspace that visually depicts representations of the elements of ontology 150 for which mappings are defined in schema map 140. FIG. 1B provides an exemplary depiction of graphical interface 115 for visually depicting representations of the elements of ontology 150. Graphical interface 115 also includes controls for adding new elements to schema map 140 and/or ontology 150, including objects, properties of objects, and relationships, via the visual workspace. After elements of ontology 150 are represented in the visual workspace, graphical interface 115 can further provide controls in association with the representations that allow for modifying the elements of ontology 150 and identifying how the elements of ontology 150 correspond to elements of schemas 135. Optionally, the graphical interface 115 can further utilize the sample data 136 to provide the user with a preview of object model 160 as the user defines schema map 140. In response to the input via the various controls of graphical interface 115, definition component 110 can generate and/or modify ontology 150 and schema map 140.

Transformation component 120 can be invoked after schema map 140 and ontology 150 have been defined or redefined. Transformation component 120 identifies schema map 140 and ontology 150. Transformation component 120 further reads data sources 130 and identifies schemas 135 for data sources 130. For each element of ontology 150 described in schema map 140, transformation component 120 iterates through some or all of the data items of data sources 130, generating elements of object model 160 in the manner specified by schema map 140. In some embodiments, transformation component 120 can store a representation of each generated element of object model 160 in a database 170. In some embodiments, transformation component 120 is further configured to synchronize changes in object model 160 back to data sources 130.

Data sources 130 can be one or more sources of data, including, without limitation, spreadsheet files, databases, email folders, document collections, media collections, contact directories, and so forth. Data sources 130 can include data structures stored persistently in non-volatile memory. Data sources 130 can also or instead include temporary data structures generated from underlying data sources via data extraction components, such as a result set returned from a database server executing an database query.

Schema map 140, ontology 150, and schemas 135 can be stored in any suitable structures, such as XML files, database tables, and so forth. In some embodiments, ontology 150 is maintained persistently. Schema map 140 can or cannot be maintained persistently, depending on whether the transformation process is perpetual or a one-time event. Schemas 135 need not be maintained in persistent memory, but can be cached for optimization.

Object model 160 comprises collections of elements such as typed objects, properties, and relationships. The collections can be structured in any suitable manner. In some embodiments, a database 170 stores the elements of object model 160, or representations thereof. In some embodiments, the elements of object model 160 are stored within database 170 in a different underlying format, such as in a series of object, property, and relationship tables in a relational database.

Figure 2:
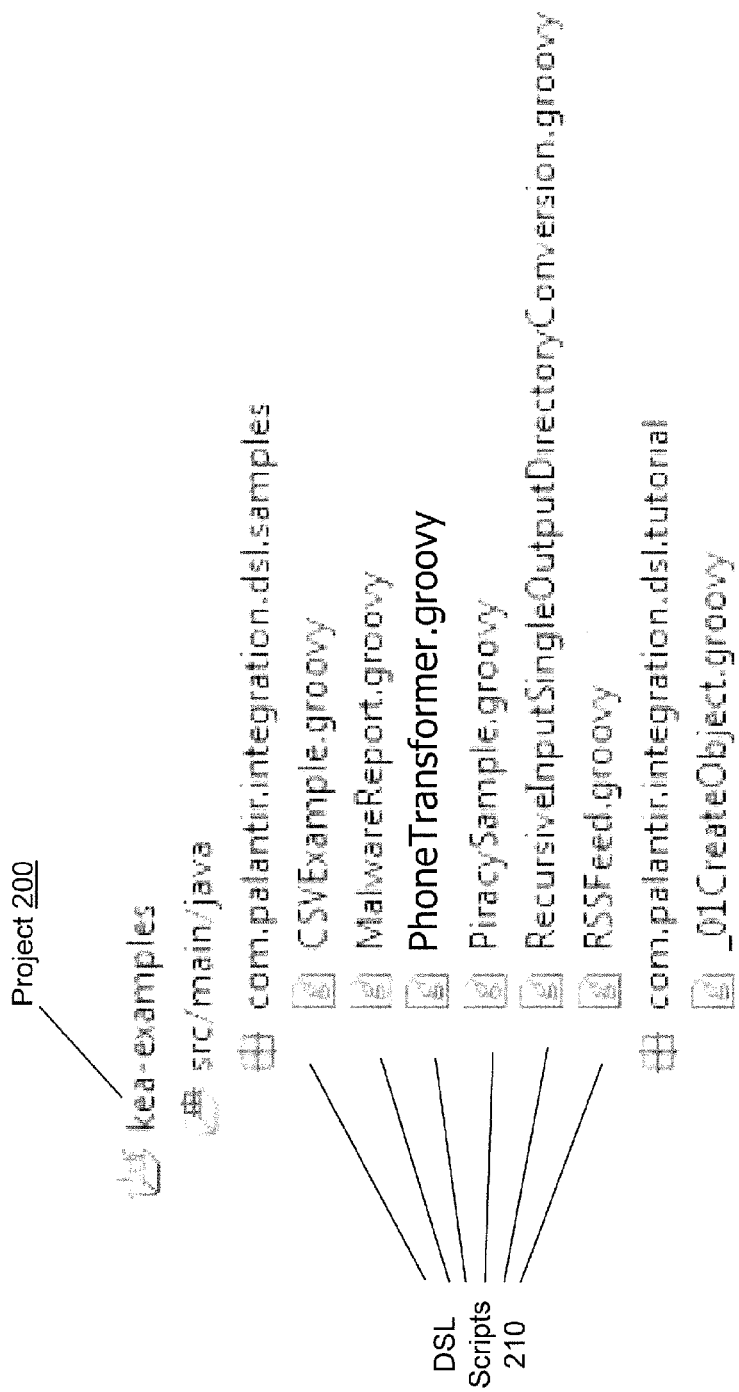
FIG. 2 shows an exemplary project providing one or more transformation scripts associated with data transformation, consistent with embodiments of the present disclosure.

FIG. 2 shows an exemplary project 200 providing one or more scripts 210. Project 200 and its corresponding scripts 210 can be processed by a transformer (such as transformation component 120). Scripts 210 can include one or more transformation scripts associated with transforming some or all data items of data sources 130 into elements for object model 160. In this particular example, project 200 is titled "kea-examples" and has scripts CSVExample.groovy, MalwareReport.groovy, PhoneTransformer.groovy, PiracySample.groovy, RecursiveInputSingleOutputDirectoryConversion.groovy, and RSSFeed.groovy. Project 200 also includes, among other things, a log.properties file for providing instructions for logging outputs and a configuration file for assisting with the running of one or more scripts 210.

FIG. 3 shows an exemplary configuration file 300 for project 200 described above with reference to FIG. 2. Configuration file 300 can be processed by a transformer (such as transformation component 120). Among other things, configuration file 300 can be used for setting parameters while running one or more scripts 210 associated with configuration file 200. Configuration file 300 can identify an ontology file 310 that provides naming and arrangement of objects, properties, and/or links for determining whether proposed outputs from scripts are valid. Ontology file 310 is part of ontology 150 described above. While ontology file 310 is identified in configuration file 200, in some embodiments configuration file 300 points to location where ontology file 310 is located.

Ontology file 310 can have one or more ontology parameters. These ontology parameters assign entities to either an object, property of an entity designated as an object, or a link between objects. For example, an ontology parameter define entity "Organization" as being an object. Additional ontology parameters can define entities "Charity," "Church," and "Academic Organization" as being properties of object "Organization." On the flip side, the entity "Birthplace" would not be a property of "Organization"; thus, there would be no ontology parameter assigning the "Birthplace" property to the "Organization" object.

FIG. 4 shows exemplary transform method 400 of the PhoneTransformer.groovy script identified in project 200 illustrated above in FIG. 2. Transform method 400 includes, among other things, a link builder 410 and a content processor interface 420. Transform method 400 can be processed by a transformer (such as transformation component 120).

In the exemplary embodiment of FIG. 4, transform method 400 includes code for asking a user how to import data (such as calls), by providing two link build options. These options include either (i) aggregating multiple calls between phone number xxx-xxx-xxxx and phone number yyy-yyy-yyyy into a single link or (ii) showing each call between the two numbers as individual link events. In terms of the transformer, a difference between the two options is how links are built. In this example, the building of a link is managed by passing a link building closure (linkBuilder 410) to the link method that processes each row of data.

Exemplary link builder methods 500 are illustrated in FIG. 5 and can be processed by a transformer (such as transformation component 120). Link builder methods 500 include CreateAggregateCallLinks method 510 that creates links collapsing call events between common endpoints into a single link and CreateIndividualCallLinks method 520 that creates links for individual call events for each call between endpoints.

After link builder 410 determines how calls are aggregated, content processor interface 420 can call a process method that performs the transformation of one or more data items from a data sources to elements of an object model. An exemplary process method 600 is shown in FIGS. 6A and 6B and can be processed by a transformer (such as transformation component 120). Process method 600 iterates through data items (such as a row of table), creates a builder, and calls processRow to create an object model having objects and links for the row. When creating a builder, process method 600 can leverage a domain-specific language (DSL) builder 700 shown in the exemplary builder of FIG. 7. DSL builder 700 can be processed by a transformer, such as transformation component 120.

DSL builder 700 is an exemplary builder that includes multiple entities: entity1 710 and entity2 720. Entity1 710 and entity2 720 are built using data items in order to create objects in the ontology "person" and "phone call" defined in ontology file 310 (referred to above in FIG. 3). Moreover, both entity1 710 and entity2 720 include their corresponding properties 715, 725, which also should be defined in ontology file 310.

For example, DSL builder 700 could receive the following data items for building objects entity1 710 and entity2 720 and their corresponding properties 715, 725:

| Name | Address | Phone Number | SSN# |
|---|---|---|---|
| Tom Smith | 123 Grant Avenue | 123-456-7890 | 999-88-7777 |
| David Bruce | 345 Lincoln Street | 987-654-3210 | 111-22-3333 |

DSL builder 700, using the first data item, could build a person object such as "Tom Smith." The properties further defining object "Tom Smith" could include first_name value "Tom," last_name value "Smith," address value "123 Grant Avenue, New York, N.Y." phone_number value "123-456-7890," and SSN value "999-88-7777." Moreover, address can be further defined as street_number value "123," street value "Grant Avenue," city value "New York," and state value "NY."

In some embodiments, DSL builder 700 can be created using a dynamic language, such as Groovy. While Groovy supports the internal (or embedded) DSL used for DSL builder 700, other dynamic languages, such as Python and Ruby, can also support the embedded DSL. These dynamic languages allow an object method to be called without that object method being defined, and the object can determine how to handle the method call. In other words, DSL builder 700 allows for a shorthand notation (e.g., "name") that can expand out to a proper notation (e.g., "object.name"). If, however, the shorthand notation is misspelled (e.g., "namme") in the DSL builder 700 or if the shorthand notation does not correspond with an ontology parameter in ontology file (e.g., property type identified in the DSL builder 700 is not defined or allowed in ontology file), a validation error (further addressed below) would occur during the debugging phase.

Figure 8:
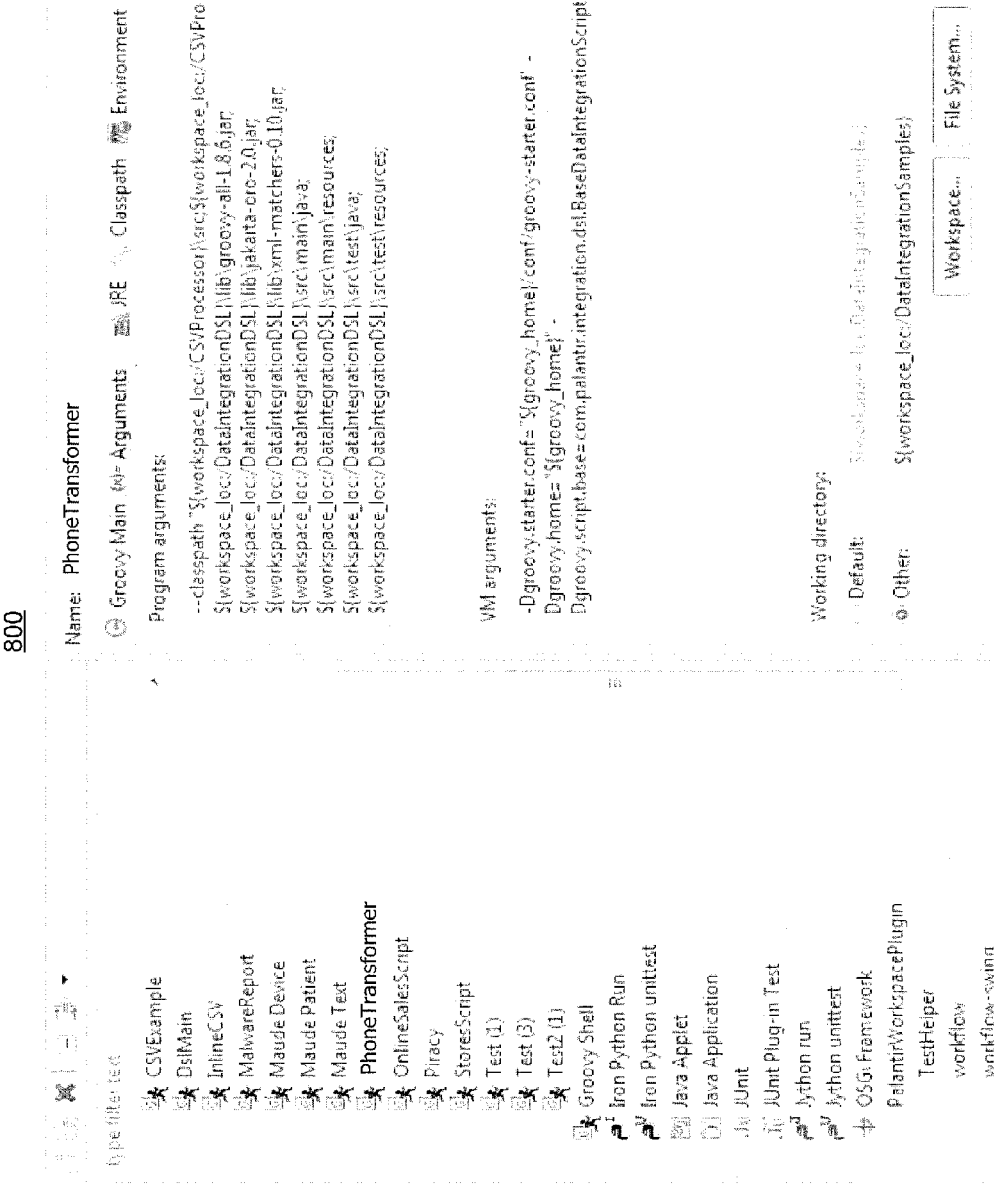
FIG. 8 shows an exemplary software development environment for debugging a transformation script, consistent with embodiments of the present disclosure.

FIG. 8 illustrates an exemplary embodiment of a software development environment 800 used for debugging a transformation script. Before debugging the transformation script, such as the PhoneTransformer script described above with reference to FIG. 2, project 200 should be loaded into software development environment 800. The debug configurations for PhoneTransformer script can allow for the use of core helper functions, such as serialize( ) function and createBuilder( ) function (e.g., DSL builder 700).

Using a DSL builder (such as a Groovy Builder) can provide the ability to create a proactive debugging experience. Proactive debugging provides validation notifications as they arise during the debugging process, as opposed to providing a series of error notifications after the transformation script (which has transformed most, if not all, data items of identified input data into elements of an object model) has been executed. By providing a proactive debugging, a user or developer can then fix the problem that caused the error notification and begin debugging the script again.

One advantage over previous large-scale data integration models is that the embodiments of the present disclosure can avoid having to parse and transform large amounts of data, which can take, for example, four to six hours before the user finds out whether there are any error notifications and, if so, the types of error notifications. After fixing any errors, the user would then have to go through the same process of parsing and transforming the imported input data, which can take another four to six hours before the user finds out whether there are any error notifications during the second round. Such conventional debugging can occur for several rounds before the script is successfully debugged.

The embodiments described herein can overcome the inefficiencies of conventional debugging of transformation scripts by providing proactive debugging of the transformation script. As stated above, proactive debugging displays error notifications as they occur. For example, if an error occurs based on row 1 of an imported table, an expressed result, such as a displayed notification, could then be displayed to the user after that validation issue is detected at row 1. This allows the user to correct the error associated with the first row of the imported table without having to go through the entire imported table, which could include hundreds of thousands of rows, if not more.

In some embodiments, a software development environment is not needed for debugging a script. For example, the debugging can occur by running the script over a command line.

Figure 9:
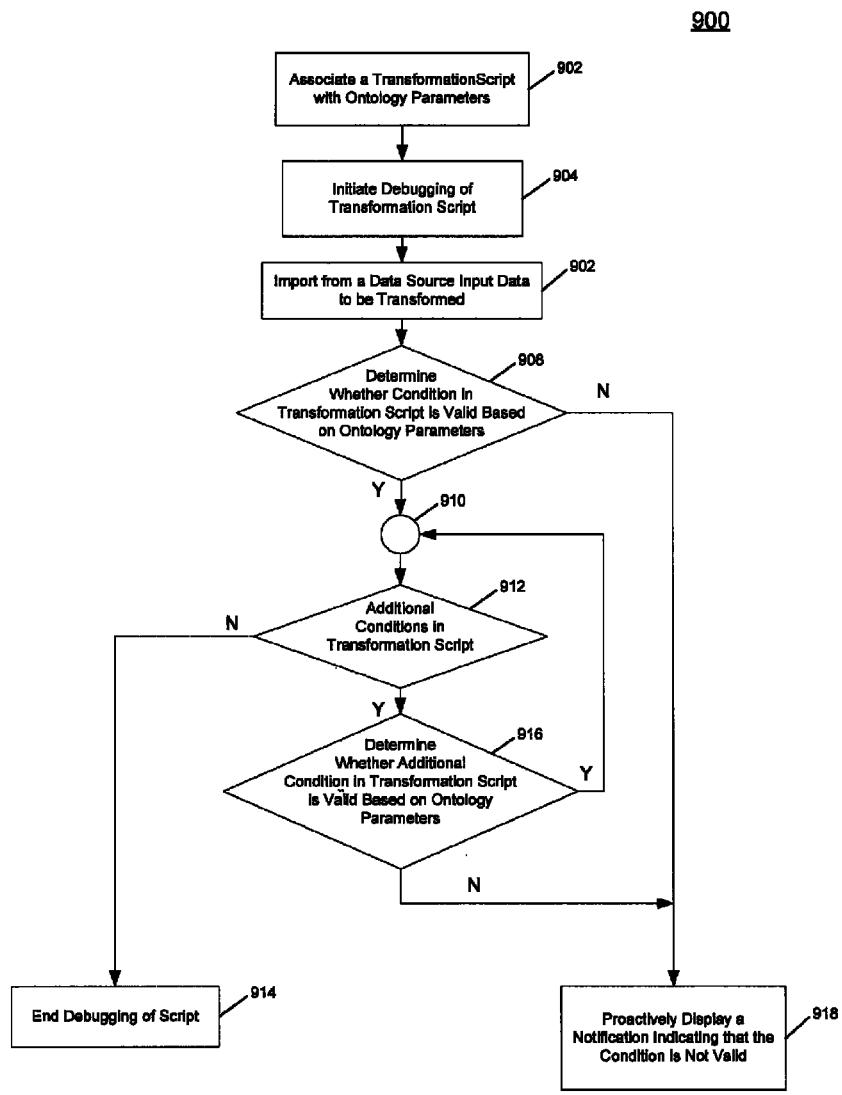
FIG. 9 is a flowchart representing an exemplary method for proactive validation of a transformation script, consistent with embodiments of the present disclosure.

FIG. 9 is a flowchart representing an exemplary method for proactive validation of a transformation script. The transformation script provides functionality for transforming large amounts of data items of data sources into elements of an object model. While the flowchart discloses the following steps in a particular order, it is appreciated that at least some of the steps can be moved, modified, or deleted where appropriate.

In step 902, a transformation script is associated with one or more ontology parameters. In some embodiments, the association can occur by linking the transformation script to a configuration file identifying an ontology file (e.g., ontology file 310) having one or more ontology parameters. In some other embodiments, the association can occur by having the ontology file located in the same directory as the transformation script. For example, as shown above in the exemplary embodiments of FIGS. 2 and 3, transformation scripts 210 of project 200 correspond to ontology file 310 identified in configuration file 300 of project 200. In some other embodiments, the association occurs when the ontology file is called during the debugging of transformation script (referenced below in step 904). The ontology parameters identified in ontology file 310 could then be applied, where appropriate, to conditions in transformation scripts 210.

In step 904, debugging of transformation script is initiated. The debugging can be initiated by a number of means. For example, the debugging can be initiated via a software development environment, such as software development environment 800 described above with reference to FIG. 8. The debugging can also be initiated via command line.

In step 906, input data to be transformed is imported from a data source. This input data can be from one or more data sources. The input data can be structured data (such as tables having rows and columns or a comma-separated value (CSV) files) or can be unstructured data (such as documents, emails, PDF, PowerPoint, and HTML files). For example, the input data can include tables having hundreds of thousands of rows to be transformed.

In step 908, a determination is made whether a condition in transformation script is valid based on the ontology parameters. Transformation script can include one or more conditions. For example, a builder (such as DSL builder 700) can define an entity as an object (e.g., entity1 710), a property of that object (e.g., entityProperty 715), and any links (e.g., link 730). Any definitions in the builder can then be compared to one or more ontology parameters in ontology file (e.g., ontology file 310). Referring back to the "Organization" ontology above, if the builder defines an "Organization" entity as being an object, the condition (defining "Organization" entity as being an object) in the builder will be determined to be valid. Moreover, if the builder defines a "Charity" entity as being a property of the "Organization" entity, the condition (defining "Organization" entity as being an object) in the builder will be determined to be valid. On the other hand, if the builder defines "Birthplace" as being a property of the "Organization" object, the condition will be invalid. Moreover, if the builder incorrectly defines an "Association" object—instead of the correct "Organization" object—this condition will also fail because there would be no "Association" object ontology parameter.

If it is determined that the condition is not valid, at step 918, a notification indicating that the condition is not valid can be proactively displayed. That is, the notification can be displayed shortly after it is determined that the condition is not valid. For example, the notification could be displayed almost instantaneously, seconds, or minutes after the determination. As stated above, proactive debugging, which provides the proactive displaying of appropriate invalidation notifications as they arise, provides an advantage of saving a user's time when debugging the code because it avoids having to parse and transform large amounts of data. In some embodiments, an expressed result is provided if the condition is determined to be not valid. The expressed result can be the proactive displaying of the notification in the debugger, an email or popup window showing that the condition is not valid, or any other way for indicating that the condition is not valid. Moreover, the expressed result can show that the condition is not valid by displaying an error message, an acronym, a number, graphic, and/or any other indication showing that condition is not valid.

If, on the other hand, the condition is determined to be valid, the method proceeds through connector 910 to determine (912) if there are additional conditions in the transformation script. In some embodiments, an expressed result can be provided, indicating that the condition is valid. The expressed result can be a displayed notification in the debugger, an email or popup window showing that the condition is valid, and/or any other way for indicating that the condition is valid. As indicated above, the expressed result can show that the condition is valid by displaying a validation message, an acronym, a number, graphic, and/or any other indication showing that condition is valid. In some embodiments, an implicit result can be provided. The implicit result can include recording the result of the valid condition to a file, a storage location, an email, and/or not displaying that the condition is valid. If the results are recorded, the recorded results can show a validation message, an acronym, a number, graphic, and/or any other indication showing that condition is valid. If there are no additional conditions in the transformation script, then the debugging of script ends (914). In some embodiments, an expressed result can be provided, indicating that the transformation script is valid.

On the other hand, if there are additional conditions in the transformation script, at step 916, a determination is made whether an additional condition in transformation script is valid based on the ontology parameters. Determination step 916 is similar to determination step 908. If the condition is determined to be invalid, an expressed result can be provided, such as in this exemplary embodiment a notification indicating that the condition is proactively displayed. As indicated above, the expressed result can show that the condition is not valid by displaying an error message, an acronym, a number, graphic, and/or any other indication showing that condition is not valid.

On the other hand, if the condition is determined to be valid, the method proceeds through connector 910 to determination step 912. In some embodiments, an expressed result can be provided, indicating that the condition is valid. The expressed result can be a displayed notification in the debugger, an email or popup window showing that the condition is valid, and/or any other way for indicating that the condition is valid. The expressed result can show that the condition is valid by displaying a validation message, an acronym, a number, graphic, and/or any other indication showing that condition is valid. Moreover, in some embodiments an implicit result can be provided. The implicit result can include recording the result of the valid condition to a file, a storage location, an email, and/or not displaying that the condition is valid. If the results are recorded, the recorded results can show a validation message, an acronym, a number, graphic, and/or any other indication showing that condition is valid.

According to some embodiments, the operations, techniques, and/or components described herein are implemented by one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques, and/or components described herein, or can include one or more general purpose hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the techniques and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Conventional operating systems may control and schedule computer processes for execution, perform memory management, provide file system, networking, I/O services, and/or provide a user interface functionality, such as a graphical user interface ("GUI"), among other things.

Figure 10:
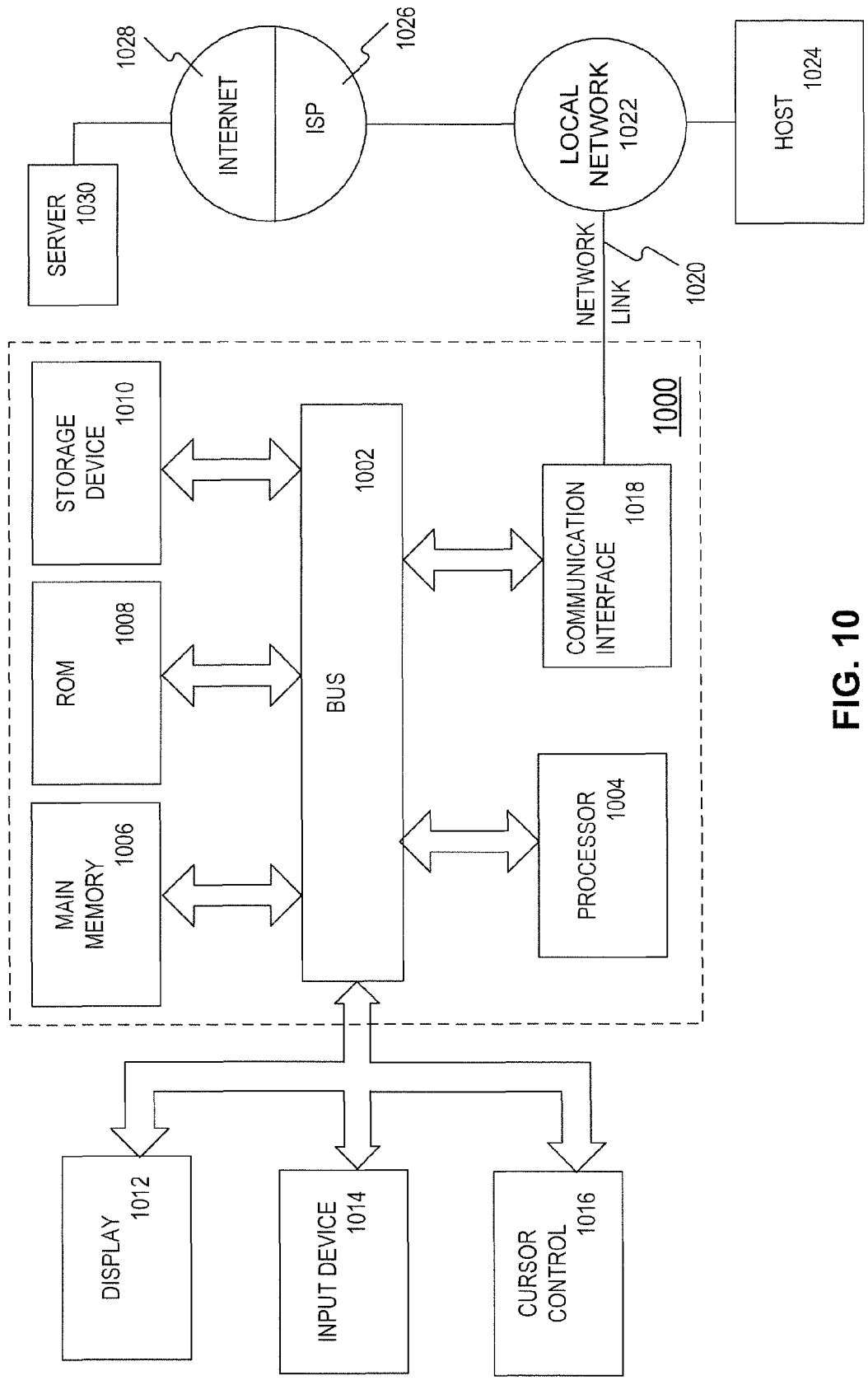
FIG. 10 shows, in block diagram form, an exemplary computer system with which embodiments described herein can be implemented, consistent with embodiments of the present disclosure.

By way of example, FIG. 10 is a block diagram that illustrates an exemplary computer system 1000. Computer system 1000 includes a bus 1002 or other communication mechanism for communicating information, and one or more hardware processors 1004 coupled with bus 1002 for processing information. One or more hardware processors 1004 can be, for example, one or more general purpose microprocessors.

Computer system 1000 also includes a main memory 1006, such as a random access memory (RAM) or other dynamic storage device, coupled to bus 1002 for storing information and instructions to be executed by one or more processors 1004. Main memory 1006 also can be used for storing temporary variables or other intermediate information during execution of instructions to be executed by one or more processors 1004. Such instructions, when stored in non-transitory storage media accessible to one or more processors 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for one or more processors 1004. A storage device 1010, such as a magnetic disk, optical disk or USB thumb drive (Flash drive) etc., is provided and coupled to bus 1002 for storing information and instructions.

Computer system 1000 can be coupled via bus 1002 to a display 1012, such as a cathode ray tube (CRT), for displaying information to a computer user. An input device 1014, including alphanumeric and other keys, is coupled to bus 1002 for communicating information and command selections to one or more processors 1004. Another type of user input device is cursor control 1016, such as a mouse, a trackball, or cursor direction keys for communicating direction information and command selections to one or more processors 1004 and for controlling cursor movement on display 1012. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computer system 1000 can include a user interface module to implement a GUI that may be stored in a mass storage device as executable software codes that are executed by the one or more computing devices. This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that may be combined with other modules or divided into sub-modules despite their physical organization or storage.

Computer system 1000 can implement the techniques and other features described herein using customized hard-wired logic, one or more ASICs or FPGAs, firmware and/or program logic which in combination with the computer system causes or programs computer system 1000 to be a special-purpose machine. According to some embodiments, the techniques and other features described herein are performed by computer system 1000 in response to one or more processors 1004 executing one or more sequences of one or more instructions contained in main memory 1006. Such instructions can be read into main memory 1006 from another storage medium, such as storage device 1010. Execution of the sequences of instructions contained in main memory 1006 causes one or more processors 1004 to perform the process steps described herein. In alternative embodiments, hard-wired circuitry can be used in place of or in combination with software instructions.

The term "non-transitory media" as used herein refers to any media storing data and/or instructions that cause a machine to operate in a specific fashion. Such non-transitory media can comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media can be involved in carrying one or more sequences of one or more instructions to processor 1004 for execution. For example, the instructions can initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which one or more processors 1004 retrieve and execute the instructions. The instructions received by main memory 1006 can optionally be stored on storage device 1010 either before or after execution by one or more processors 1004.

Computer system 1000 also includes a communication interface 1018 coupled to bus 1002. Communication interface 1018 provides a two-way data communication coupling to a network link 1020 that is connected to a local network 1022. For example, communication interface 1018 can be an integrated services digital network (ISDN) card, cable modem, satellite modem, or a modem to provide a data communication connection to a corresponding type of telephone line. As another example, communication interface 1018 can be a local area network (LAN) card to provide a data communication connection to a compatible LAN. Wireless links can also be implemented. In any such implementation, communication interface 1018 sends and receives electrical, electromagnetic, or optical signals that carry digital data streams representing various types of information.

Network link 1020 typically provides data communication through one or more networks to other data devices. For example, network link 1020 can provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code can be executed by one or more processors 1004 as it is received, and/or stored in storage device 1010, or other non-volatile storage for later execution.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different or modified order, as needed.

What is claimed is:

1. A method for providing a proactive validation of a transformation script, the method being performed by one or more processors and comprising:

associating the transformation script with ontology parameters, wherein the ontology parameters assign a link between two entities;

initiating a debugging operation of the transformation script having at least one condition, wherein the transformation script uses a builder that creates a link between two entities;

importing, from a data source, at least one data item for transformation;

determining, as part of the debugging operation, whether the at least one condition that uses the at least one data item is valid based on the ontology parameters, wherein the one or more processors determines that the at least one condition is not valid if the assigned link in the ontology parameters is inconsistent with the created link in the builder; and providing an indication of a result associated with the determination, wherein the result is at least one of an expressed result or an implicit result.

2. The method of claim 1, wherein providing the indication of the result associated with the determination comprises:

if the at least one condition is determined to be not valid, providing the indication of the result to a display device for displaying an expressed result indicating that the at least one condition is not valid.

3. The method of claim 2, wherein indicating the result associated with the determination comprises:
   if the at least one condition is determined to be valid and the transformation script includes at least one subsequent condition to be debugged, providing an implicit result indicating that the at least one condition is valid; and
   if the at least one condition is determined to be valid and if the transformation script does not include any subsequent conditions to be debugged, displaying on the display device an expressed result indicating that the transformation script has been validated.

4. The method of claim 2, wherein providing the indication of the result to the display device for displaying comprises:
   displaying the expressed result upon determining that the at least one condition is not valid.

5. The method of claim 1,
   wherein the ontology parameters include parameters that assign an entity as being an object or a property of an object; and
   further wherein the transformation script uses the builder that defines the entity as being an object or a property of an object.

6. The method of claim 5, wherein the builder uses domain-specific language.

7. The method of claim 5, wherein determining comprises:
   determining that the at least one condition is not valid if the assignment of the entity in the ontology parameters is inconsistent with the definition of the entity in the builder.

8. An apparatus for providing a proactive validation of a transformation script, the apparatus comprising:
   a memory device that stores a set of instructions:
   one or more processors that execute the set of instructions to configure the one or more processors to:
   associate the transformation script with ontology parameters, wherein the ontology parameters assign a link between two entities;
   initiate a debugging operation of the transformation script having at least one condition, wherein the transformation script uses a builder that creates a link between two entities;
   import, from a data source, at least one data item for transformation;
   determine, as part of the debugging operation, whether the at least one condition that uses the at least one data item is valid based on the ontology parameters, wherein the one or more processors determines that the at least one condition is not valid if the assigned link in the ontology parameters is inconsistent with the created link in the builder; and
   provide an indication of a result associated with the determination, wherein the result is at least one of an expressed result or an implicit result.

9. The apparatus of claim 8, further comprising a display device configured to provide an expressed result indicating that the at least one condition is not valid.

10. The apparatus of claim 8,
    wherein the ontology parameters include parameters that assign an entity as being an object or a property of an object; and
    further wherein the transformation script uses the builder that defines the entity as being an object or a property of an object.

11. The apparatus of claim 10, wherein the builder uses domain-specific language.

12. The apparatus of claim 10, wherein the one or more processors determine that at least one condition is not valid if the assignment of the entity in the ontology parameters is inconsistent with the definition of the entity in the builder.

13. A non-transitory computer readable medium that stores a set of instructions that are executable by at least one processor to cause the at least one processor to perform a method for providing a proactive validation of a transformation script, the method comprising:
    associating the transformation script with ontology parameters, wherein the ontology parameters assign a link between two entities;
    initiating a debugging operation of the transformation script having at least one condition, wherein the transformation script uses a builder that creates a link between two entities;
    importing, from a data source, at least one data item for transformation;
    determining, as part of the debugging operation, whether the at least one condition that uses the at least one data item is valid based on the ontology parameters, wherein the one or more processors determines that the at least one condition is not valid if the assigned link in the ontology parameters is inconsistent with the created link in the builder; and
    providing an indication of a result associated with the determination, wherein the result is at least one of an expressed result or an implicit result.

14. The non-transitory computer readable medium of claim 13, wherein providing the indication of the result comprises:
    if the at least one condition is determined to be not valid, providing the indication of the result to a display device for displaying the expressed result indicating that the at least one condition is not valid.

15. The non-transitory computer readable medium of claim 14, wherein providing the indication of the result to the display device comprises:
    displaying the expressed result upon determining that the at least one condition is not valid.

16. The non-transitory computer readable medium of claim 13,
    wherein the ontology parameters include parameters that assign an entity as being an object or a property of an object; and
    further wherein the transformation script uses the builder that defines the entity as being an object or a property of an object.

17. The non-transitory computer readable medium of claim 16, wherein the builder uses domain-specific language.

18. The non-transitory computer readable medium of claim 16, wherein determining comprises:
    determining that the at least one condition is not valid if the assignment of the entity in the ontology parameters is inconsistent with the definition of the entity in the builder.

* * * * *